US012213106B2

(12) United States Patent
Hoang et al.

(10) Patent No.: US 12,213,106 B2
(45) Date of Patent: *Jan. 28, 2025

(54) RADIO (NR) VEHICLE TO EVERYTHING (V2X) METHODS FOR SENSING AND RESOURCE ALLOCATION

(71) Applicant: InterDigital Patent Holdings, Inc., Wilmington, DE (US)

(72) Inventors: Tuong Hoang, Montreal (CA); Moon-il Lee, Melville, NY (US); Tao Deng, New York, NY (US); Martino M. Freda, Laval (CA); Chunxuan Ye, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,201

(22) Filed: Apr. 30, 2024

(65) Prior Publication Data
US 2024/0284408 A1 Aug. 22, 2024

Related U.S. Application Data

(63) Continuation of application No. 17/634,627, filed as application No. PCT/US2020/046132 on Aug. 13, 2020.

(Continued)

(51) Int. Cl.
*H04W 72/02* (2009.01)
*H04L 1/1812* (2023.01)
(Continued)

(52) U.S. Cl.
CPC .......... *H04W 72/02* (2013.01); *H04L 1/1812* (2013.01); *H04L 5/0053* (2013.01);
(Continued)

(58) Field of Classification Search
CPC ..... H04W 72/02; H04W 72/56; H04W 72/20; H04W 72/542; H04W 72/0446; H04L 1/1812; H04L 5/0053
See application file for complete search history.

(56) References Cited

U.S. PATENT DOCUMENTS

2020/0228247 A1 7/2020 Guo et al.
2020/0336253 A1 10/2020 He et al.
(Continued)

OTHER PUBLICATIONS

Ericsson, "Feature lead summary #4 on Resource allocation for NR sidelink Mode 1," 3GPP TSG RAN WG1 Meeting #97, R1-1907916, Reno, USA (May 13-17, 2019).

(Continued)

*Primary Examiner* — Jasper Kwoh
(74) *Attorney, Agent, or Firm* — VOLPE KOENIG

(57) ABSTRACT

A wireless transmit receive unit (WTRU) may receive first data on a first physical sidelink shared channel (PSSCH) transmission. Further, the WTRU may transmit second data on a second PSSCH transmission. The WTRU may then determine, based on a first priority associated with the first data and a second priority associated with the second data, prioritization between a transmission of a first physical sidelink feedback channel (PSFCH) transmission associated with the first data and a reception of a second PSFCH transmission associated with the second data. Moreover, the WTRU may either, based on the prioritization determination, transmit, on the first PSFCH transmission, first hybrid automatic repeat request (HARQ) acknowledgement (ACK)/negative ACK (NACK) feedback associated with the first data, or receive, on the second PSFCH transmission, second HARQ ACK/NACK feedback associated with the second data.

12 Claims, 8 Drawing Sheets

Related U.S. Application Data

(60) Provisional application No. 62/886,160, filed on Aug. 13, 2019, provisional application No. 62/908,089, filed on Sep. 30, 2019, provisional application No. 62/975,552, filed on Feb. 12, 2020.

(51) Int. Cl.
    *H04L 5/00*       (2006.01)
    *H04W 72/0446*   (2023.01)
    *H04W 72/20*     (2023.01)
    *H04W 72/542*    (2023.01)
    *H04W 72/56*     (2023.01)

(52) U.S. Cl.
    CPC ....... *H04W 72/0446* (2013.01); *H04W 72/20* (2023.01); *H04W 72/542* (2023.01); *H04W 72/56* (2023.01)

(56) References Cited

U.S. PATENT DOCUMENTS

| | | | | |
|---|---|---|---|---|
| 2020/0351032 | A1* | 11/2020 | Wu | H04W 72/20 |
| 2020/0403737 | A1* | 12/2020 | Yeo | H04L 1/1861 |
| 2021/0006318 | A1 | 1/2021 | Kim et al. | |
| 2021/0185685 | A1 | 6/2021 | Ryu et al. | |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Intel Corporation, "Sidelink Resource Allocation Mode-2 Design for NR V2X Communication," 3GPP TSG RAN WG1 Meeting #97, R1-1906796, Reno, USA (May 13-17, 2019).

Intel Corporation, "Summary#3 for AI 7.2.4.2.2 Mode-2 Resource Allocation," 3GPP TSG RAN WG1 Meeting #97, R1-1907888, Reno, USA (May 13-17, 2019).

Interdigital Inc., "NR Sidelink Mode 2 Resource Allocation," 3GPP TSG RAN WG1 #99, R1-1912740, Reno, USA (Nov. 18-22, 2019).

Interdigital Inc., "Remaining Issues on NR Sidelink Mode 1 Resource Allocation," 3GPP TSG RAN WG1 #100bis, R1-2002300, e-Meeting (Apr. 20-30, 2020).

Interdigital Inc., "Remaining Issues on NR Sidelink Mode 2 Resource Allocation," 3GPP TSG RAN WG1 #100bis, R1-2004295, e-Meeting (May 25-Jun. 5, 2020).

Interdigital Inc., "Remaining Issues on NR Sidelink Mode 2 Resource Allocation," 3GPP TSG RAN WG1 #100, R1-2000836, e-Meeting (Feb. 24-Mar. 6, 2020).

Interdigital Inc., "Remaining Issues on NR Sidelink Mode 2 Resource Allocation," 3GPP TSG RAN WG1 #100bis, R1-2002301, e-Meeting (Apr. 20-30, 2020).

Interdigital Inc., "Remaining MAC Issues for NR V2X," 3GPP RAN WG2 Meeting #109bis-e, R2-2003240, Electronic (Apr. 20-30, 2020).

Third Generation Partnership Project, "Technical Specification Group Services and System Aspects; Service requirements for V2X services; Stage 1 (Release 14)," 3GPP TS 22.185 V14.3.0 (Mar. 2017).

Third Generation Partnership Project, "Technical Specification Group Services and System Aspects; Service requirements for V2X services; Stage 1 (Release 15)," 3GPP TS 22.185 V15.0.0 (Jun. 2018).

Third Generation Partnership Project, "Technical Specification Group Services and System Aspects; Service requirements for V2X services; Stage 1 (Release 16)," 3GPP TS 22.185 V16.0.0 (Jul. 2020).

Third Generation Partnership Project, "Technical Specification Group Services and System Aspects; Enhancement of 3GPP support for V2X scenarios; Stage 1 (Release 15)," 3GPP TS 22.186 V15.3.0 (Jun. 2018).

Third Generation Partnership Project, "Technical Specification Group Services and System Aspects; Enhancement of 3GPP support for V2X scenarios; Stage 1 (Release 16)," 3GPP TS 22.186 V16.2.0 (Jun. 2019).

Third Generation Partnership Project, "Technical Specification Group Radio Access Network; Study on LTE-based V2X Services; (Release 14)," 3GPP TR 36.885 V14.0.0 (Jun. 2016).

Third Generation Partnership Project, "Technical Specification Group Radio Access Network; Study on evaluation methodology of new Vehicle-to-Everything V2X use cases for LTE and NR; (Release 15)," 3GPP TR 37.885 V1.0.0 (May 2018).

Third Generation Partnership Project, "Technical Specification Group Radio Access Network; Study on evaluation methodology of new Vehicle-to-Everything (V2X) use cases for LTE and NR; (Release 15)," 3GPP TR 37.885 V15.3.0 (Jun. 2019).

Third Generation Partnership Project, "Technical Specification Group Radio Access Network; NR; Physical layer procedures for control (Release 15)," 3GPP TS 38.213 V15.6.0 (Jun. 2019).

Third Generation Partnership Project, "Technical Specification Group Radio Access Network; NR; Physical layer procedures for control (Release 15)," 3GPP TS 38.213 V15.10.0 (Jun. 2020).

Third Generation Partnership Project, "Technical Specification Group Radio Access Network; NR; Physical layer procedures for control (Release 16)," 3GPP TS 38.213 V16.2.0 (Jun. 2020).

Third Generation Partnership Project, "Technical Specification Group Radio Access Network; NR; Multiplexing and channel coding (Release 15)," 3GPP TS 38.212 V15.6.0 (Jun. 2019).

Third Generation Partnership Project, "Technical Specification Group Radio Access Network; NR; Multiplexing and channel coding (Release 15)," 3GPP TS 38.212 V15.9.0 (Jun. 2020).

Third Generation Partnership Project, "Technical Specification Group Radio Access Network; NR; Multiplexing and channel coding (Release 16)," 3GPP TS 38.212 V16.2.0 (Jun. 2020).

Third Generation Partnership Project, "Technical Specification Group Radio Access Network; NR; NR and NG-RAN Overall Description; Stage 2 (Release 15)," 3GPP TS 38.300 V15.6.0 (Jun. 2019).

Third Generation Partnership Project, "Technical Specification Group Radio Access Network; NR; NR and NG-RAN Overall Description; Stage 2 (Release 15)," 3GPP TS 38.300 V15.10.0 (Jul. 2020).

Third Generation Partnership Project, "Technical Specification Group Radio Access Network; NR; NR and NG-RAN Overall Description; Stage 2 (Release 16)," 3GPP TS 38.300 V16.2.0 (Jul. 2020).

LG Electronics, "Discussion on physical layer procedures for NR sidelink," 3GPP TSG RAN WG1 Meeting #97, R1-1907018, Reno, USA (May 13-17, 2019).

Nokia et al., "Discussion of QoS management for sidelink ," 3GPP TSG RAN WG1 #97, R1-1906080, Reno, USA (May 13-17, 2019).

(56) References Cited

OTHER PUBLICATIONS

Third Generation Partnership Project, "Technical Specification Group Radio Access Network; NR; Physical layer procedures for data (Release 15)," 3GPP TS 38.214 V15.6.0 (Jun. 2019).
Third Generation Partnership Project, "Technical Specification Group Radio Access Network; NR; Physical layer procedures for data (Release 15)," 3GPP TS 38.214 V15.10.0 (Jun. 2020).
Third Generation Partnership Project, "Technical Specification Group Radio Access Network; NR; Physical layer procedures for data (Release 16)," 3GPP TS 38.214 V16.2.0 (Jun. 2020).

* cited by examiner

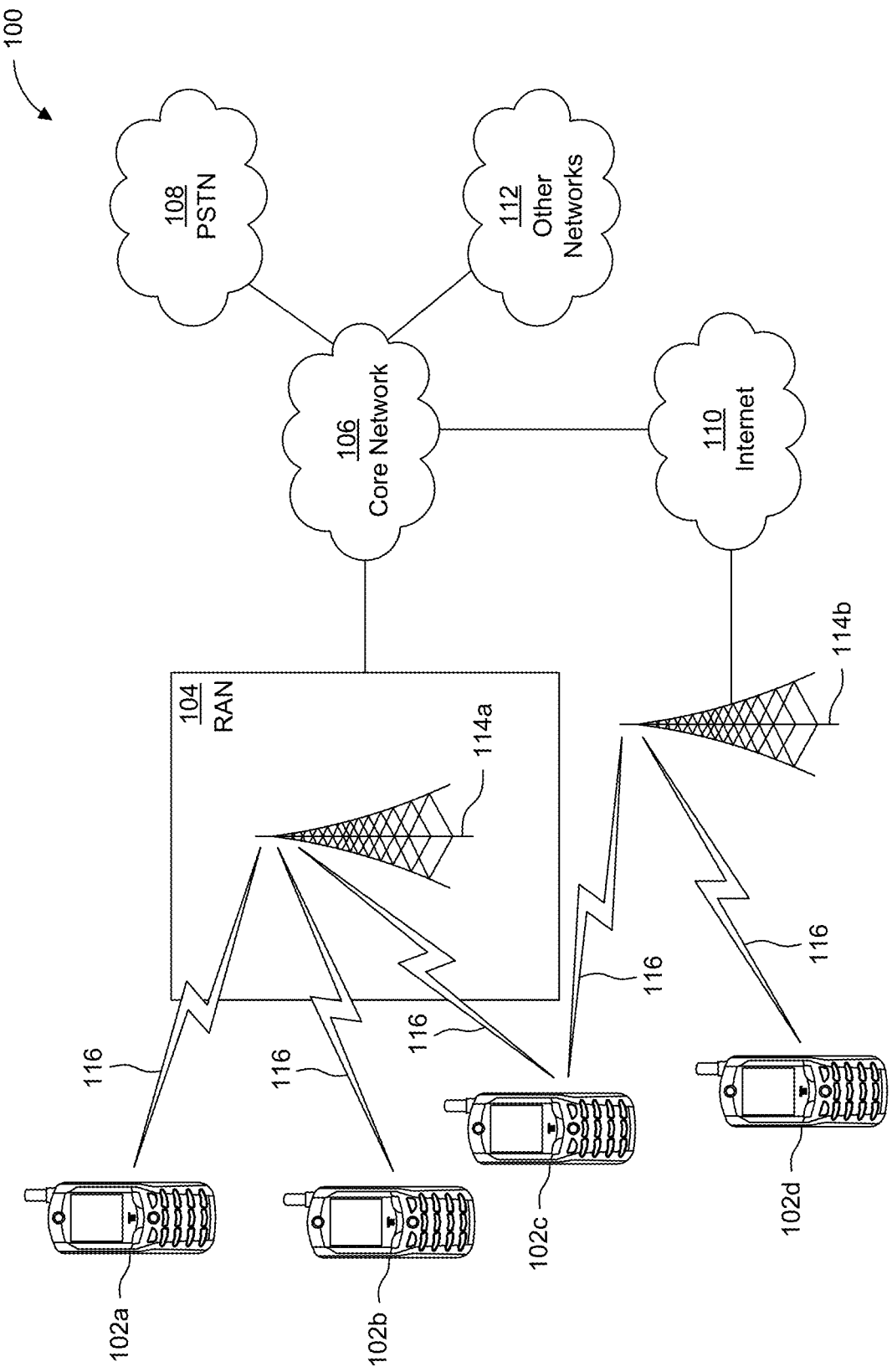

RADIO (NR) VEHICLE TO EVERYTHING (V2X) METHODS FOR SENSING AND RESOURCE ALLOCATION

CROSS-REFERENCE TO RELATED APPLICATIONS

This application is a continuation of U.S. patent application Ser. No. 17/634,627 filed Feb. 11, 2022, which is the U.S. National Stage, under 35 U.S.C. § 371, of International Application No. PCT/US2020/046132 filed Aug. 13, 2020, which claims the benefit of U.S. Provisional Application No. 62/886,160, filed Aug. 13, 2019, U.S. Provisional Application No. 62/908,089, filed Sep. 30, 2019, and U.S. Provisional Application No. 62/975,552, filed Feb. 12, 2020, the contents of which are incorporated herein by reference.

BACKGROUND

Generally, in wireless communication systems a device may need to operate within resources, such as a time and frequency, in consideration of other devices including those that it is communicating with. Various techniques and methods may be needed in order to manage and share the available resources for wireless communication. Long Term Evolution (LTE) vehicle-to-everything (V2X) features support basic safety features.

New radio (NR) V2X operations have been developed. V2X communications may include one or more of vehicle-to-vehicle (V2V) communications, vehicle-to-pedestrian (V2P) communications, vehicle-to-infrastructure (V2I) communications and Vehicle-to-Network (V2N) communications. V2X wireless transmit receive units (WTRUs) may engage in V2X communications.

SUMMARY

Systems, methods, and devices for sensing and resource allocation in new radio (NR) vehicle-to-everything (V2X) scenarios are disclosed herein. A wireless transmit receive unit (WTRU) may perform resource selection and determine a set of resources to be used for transmission. For example, the resources may be used for transmission of one or more transport blocks (TBs). The set of resources to be used for transmission may be referred to as a set of previously selected resources.

Further, the WTRU may dynamically determine to trigger resource reevaluation. The WTRU may make this determination based on a feasibility to meet latency requirements. Moreover, the latency requirement may include a remaining PDB of a TB. Also, the latency requirement may include a time gap between a previously selected resource and a remaining PDB of a second TB.

In an example, the WTRU may determine a set of selectable resources by performing resource reevaluation based on the set of previously selected resources. Further, the WTRU may select at least one first resource from the set of previously selected resources. In an example, the at least one first resource may not be in the set of selectable resource. Moreover, the WTRU may replace the first resource with at least one second resource. In an example, the at least one second resource may be in the set of selectable resource. Further, the WTRU may select at least one third resource from the set of selectable resources based on an association with the at least one second resource. The WTRU may then transmit a first TB using the at least one second resource.

In a further example, the association with the at least one second resource may be based on a HARQ status of the first TB. The HARQ status may be an enabled HARQ status of the TB, in an example. Further, the at least one third resource may be used for HARQ transmissions associated with the first TB.

In an additional example, the association with the at least one second resource may be based on a grant. In an example, the grant may be a periodic reservation grant. Accordingly, the association with the at least second first resource may be based on a periodic reservation grant associated with the first TB. Further, additional resources may include resources associated with the periodic reservation grant. For example, the at least one third resource may be associated with the periodic reservation grant. Moreover, a pre-empted resource may also be a periodically reserved resource. In another example, one or more resources may be removed based on a collision.

In an example, a WTRU may receive first data on a first physical sidelink shared channel (PSSCH) transmission. Further, the WTRU may transmit second data on a second PSSCH transmission. The WTRU may then determine, based on a first priority associated with the first data and a second priority associated with the second data, prioritization between a transmission of a first physical sidelink feedback channel (PSFCH) transmission associated with the first data and a reception of a second PSFCH transmission associated with the second data. Moreover, the WTRU may either, based on the prioritization determination, transmit, on the first PSFCH transmission, first hybrid automatic repeat request (HARQ) acknowledgement (ACK)/negative ACK (NACK) feedback associated with the first data, or receive, on the second PSFCH transmission, second HARQ ACK/NACK feedback associated with the second data.

In a further example, the WTRU may receive first sidelink control information (SCI) associated with the first PSSCH transmission. Also, the WTRU may transmit second SCI associated with the second PSSCH. The first priority may based on a first priority value. Further, the first priority value may be received in the first SCI. Also, the second priority may be based on a second priority value. Moreover, the the second priority value may be received in third SCI.

In another example, the first priority may be based on a first quality of service (QoS). Also, the second priority may be based on a second QoS. In addition, one of the first HARQ ACK/NACK feedback or the second HARQ ACK/NACK feedback may be dropped based on the first priority and the second priority.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1A is a system diagram illustrating an example communications system in which one or more disclosed embodiments may be implemented;

DETAILED DESCRIPTION

Figure 1B:
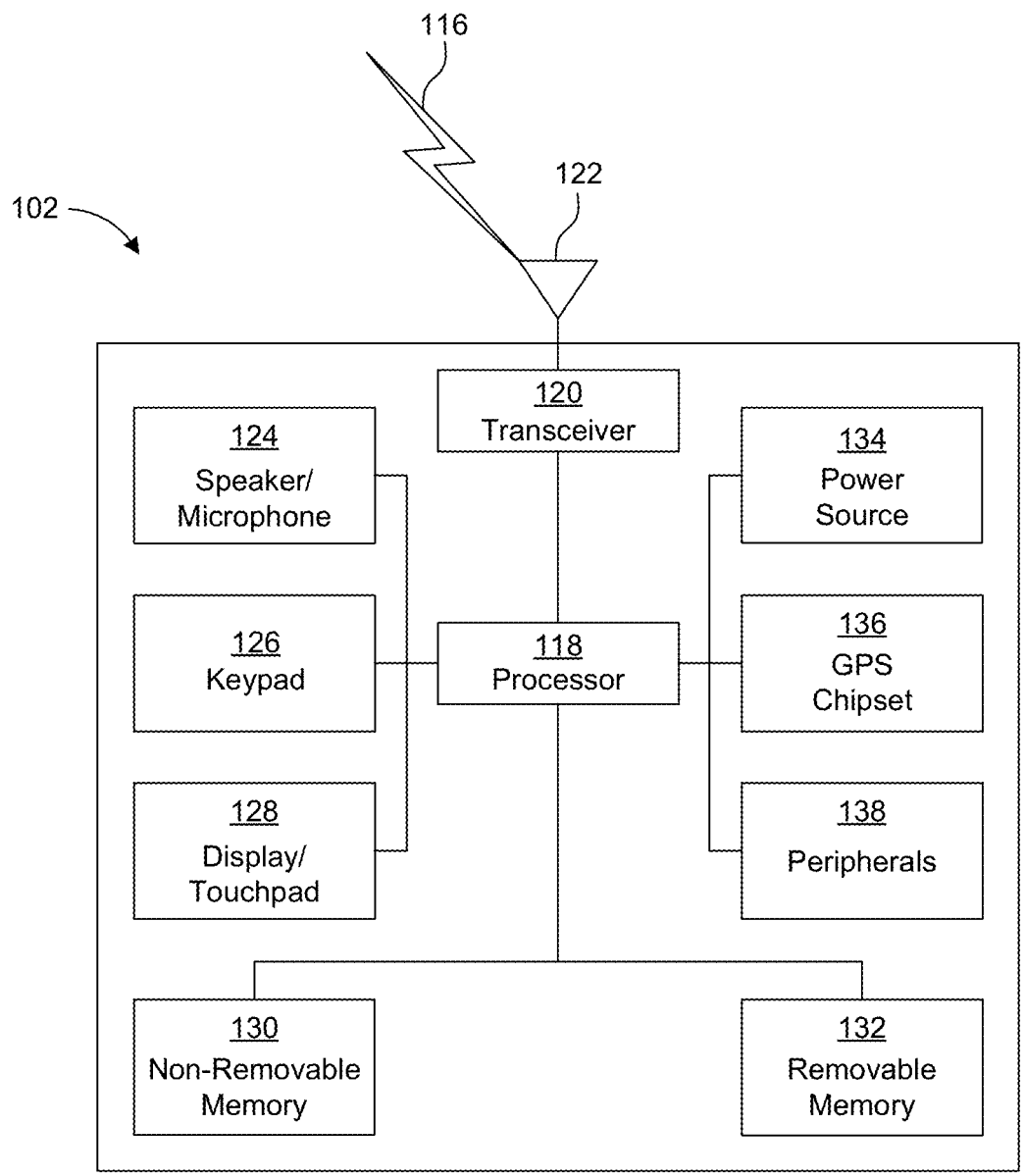
FIG. 1B is a system diagram illustrating an example wireless transmit/receive unit (WTRU) that may be used within the communications system illustrated in FIG. 1A according to an embodiment.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth© module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
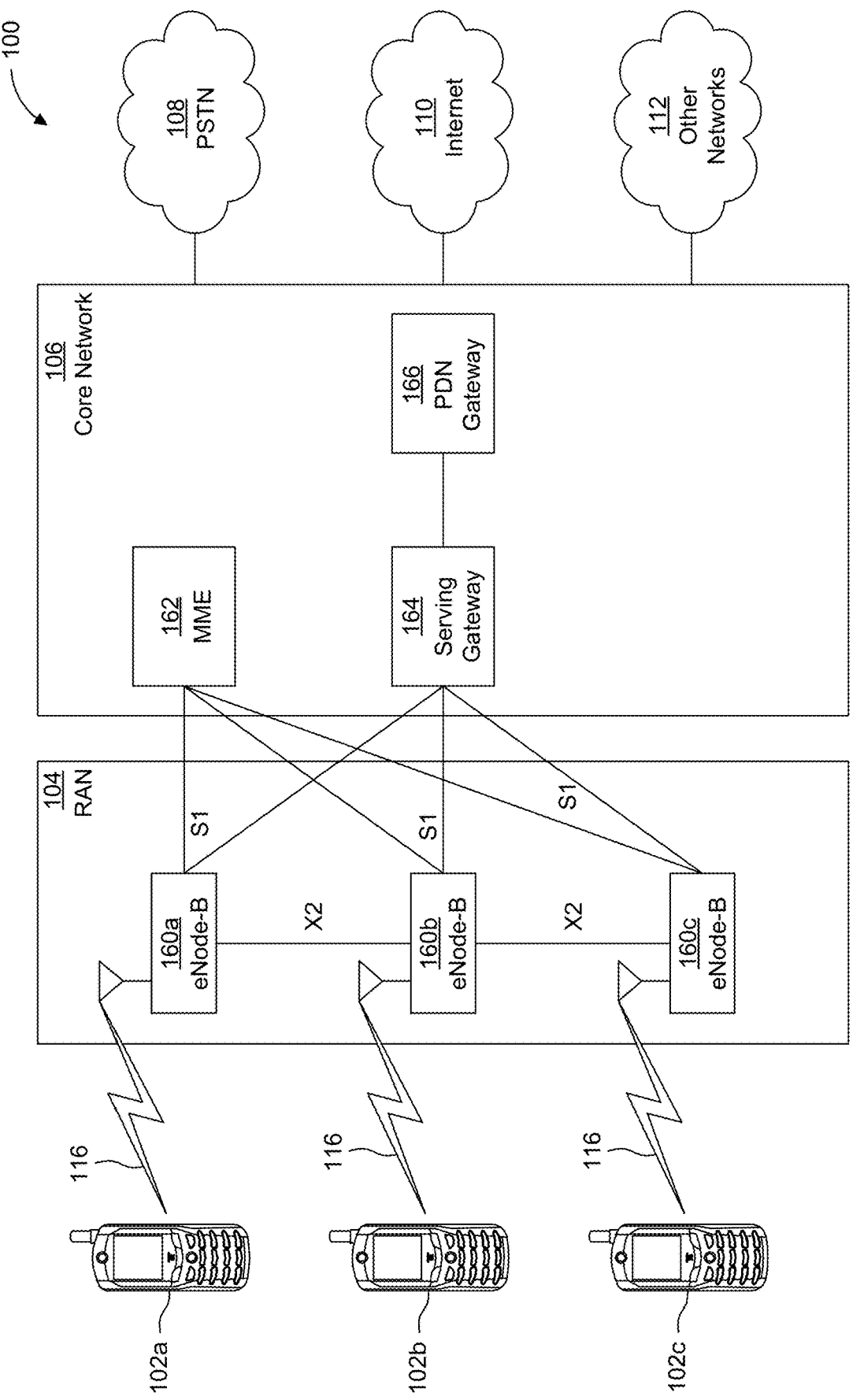
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
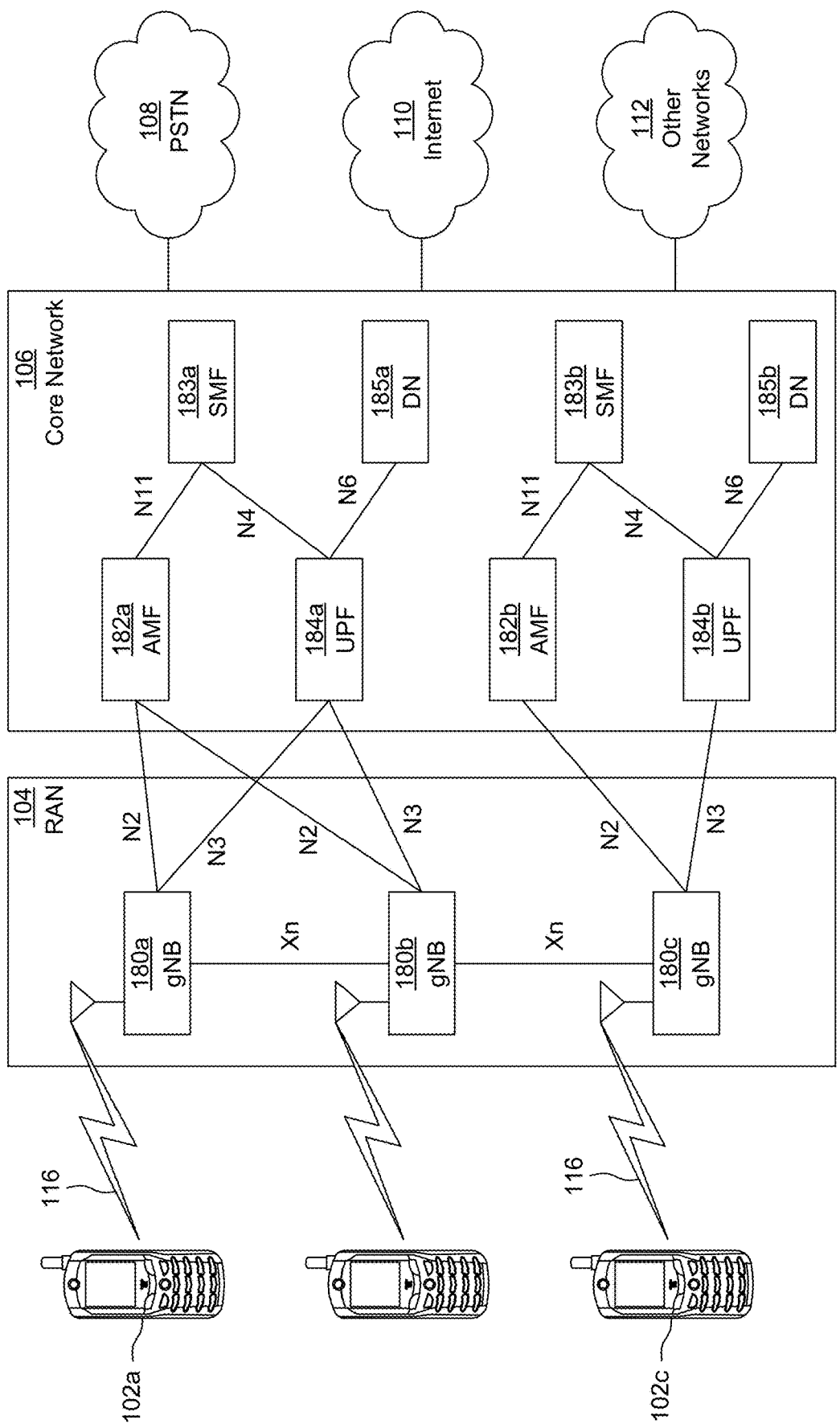
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In LTE vehicle-to-everything (V2X) communications, there may be traffic models one or more types of traffic, such as periodic and event-trigger (which may be referred to as, for example, aperiodic). For periodic traffic, one 300-byte message may be followed by four 190-byte messages; moreover, the inter-arrival time between two packets may be a multiple of 100 ms. For event-triggered traffic, when an event is triggered, which follows the Poisson process, 6 messages may be generated with a period of 100 ms.

Given the above parameters for LTE V2X traffic models, in general, both event-trigger and periodic traffic may be considered similar to or the same as periodic traffic.

Resources may need to be sensed and selected in LTE V2X. In LTE V2X, a physical sidelink control channel (PSCCH) and a physical sidelink shared channel (PSSCH) may be transmitted in the same subframe. A PSCCH may contain sidelink control information (SCI), which may contain information about PSSCH transmission. By decoding PSCCH, a received WTRU may decode the following information: frequency and time of the forward booking PSSCH; priority of the PSSCH; and/or, frequency and time of PSSCH retransmission.

In general, a vehicle WTRU in LTE V2X performs a procedure for sensing and resource selection. At first, the WTRU may perform sensing to decode SCI of other WTRUs. From decoding the SCI, the WTRU may have information of the forward booking PSSCH and its corresponding priority. The WTRU may consider the forward booking PSSCH as occupied and exclude it from resource selection if its reference signal received power (RSRP) PSSCH is greater than a threshold. The WTRU may then rank the remaining resources in the ascending order of received strength signal indicator (RSSI) and select 20% of the total resource denoted as a set $S_A$ of selectable resource for final resource selection. Finally, it may randomly select one resource in $S_A$ for transmission.

NR V2X may apply a traffic model. Similar to LTE V2X, new radio (NR) V2X may support two types of traffic, periodic and aperiodic. However, NR V2X may support many different types of packet size, packet arrival rate, and latency requirements. Specifically, model 2 aperiodic traffic may have the following properties: packet size range between 10,000 and 30,000 bytes; an average inter-arrival rate of 20 ms; and/or, latency requirements of 10 ms.

In addition, mode 3 periodic traffic may have the following properties: packet size range between 30,000 and 60,000 bytes; an average inter-arrival rate of 30 ms; and/or, latency requirements of 30 ms.

For NR V2X, long-term sensing and short-term sensing may need to be addressed. As noted, NR V2X may support both periodic and aperiodic traffic. 3GPP RAN1 may support semi-persistent (SPS) resource reservation, which can be enabled/disabled. When SPS resource reservation is enabled, long term sensing, which is utilized before triggering of a resource selection, may be utilized to avoid collision of the periodic traffics. For aperiodic traffic, short term sensing, which is executed after triggering resource selection, may be supported in an example solution described herein. NR V2X sensing and resource selection may consider the interaction of both long-term and short-term sensing.

Also for NR V2X, hybrid automatic repeat request (HARQ) transmission in the resource pool may need to be addressed. NR V2X may support three cast types, unicast, groupcast, and broadcast, in which HARQ operation may be supported for groupcast and unicast sidelink transmission. In a resource pool, HARQ feedback resources may be configured and/or pre-configured, which occurs periodically every N slot (N=1, 2, 4). Resource reservation for HARQ based retransmission may be supported in NR V2X. Therefore, NR V2X sensing and resource selection may be considered for cast type and HARQ operation in an example solution described herein.

Also for NR V2X, burst traffic may be addressed. Resource selection in LTE V2X allocates resources for a single transport block (TB). However, in NR V2X, the burst traffic may be expected. Performing sensing and resource selection for individual TB may not guarantee the QoS requirement of the TB in the burst traffic. Therefore, NR sensing and resource selection may be designed to support burst traffic, in an example solution described herein.

Also for NR V2X, pre-emption techniques may be used. NR V2X support the TB with a latency requirement as low as 3 ms. Resource selection within 3 ms resource selection window may result in high collision probability. To guarantee the QoS of such stringent TB, pre-emption may be used. In NR V2X sensing and resource selection, pre-emption may be addressed in an example solution described herein.

The terms a receiver WTRU, a receiving WTRU, a receiver, receiving, an Rx WTRU, or an Rx may be used interchangeably and still be consistent with examples and embodiments provided herein. Further, the terms a transmitter WTRU, a transmitting WTRU, a transmitter, transmitting, a Tx WTRU, or a Tx may be used interchangeably and still be consistent with examples and embodiments provided herein. Further, in one or more examples and embodiments provided herein, selection and reselection may be used interchangeably.

In some example situations, there may be methods for HARQ based transmission. Specifically, in some example situations there may be methods to support HARQ feedback transmission. For example, a WTRU may prioritize between physical sidelink feedback channel (PSFCH) transmission and reception in the same slot based on HARQ status, QoS of the data, and the number of PSSCH/PSCCH transmitted and received for each TB.

In an example situation, the WTRU may prioritize between PSFCH transmission and reception in the same slot based on at least one or more of the following: HARQ status; the index of the associated PSSCH/PSCCH for the HARQ feedback; the QoS of the data associated with PSFCH transmission and reception; the cast type of the associated PSSCH/PSCCH; the feedback type of groupcast transmission; whether the PSSCH/PSCCH Tx or Rx in the same slot; and/or, channel busy ration (CBR).

Regarding HARQ status, the WTRU may need to send an acknowledgement (ACK) or a negative ACK (NACK) and the number of bits the WTRU needs to send the HARQ feedback in order to indicate the status of one or multiple TBs. For example, if the WTRU may need to send HARQ-NACK, the PSFCH transmission (PSFCH-Tx) may be higher priority than the PSFCH reception. Also, if the WTRU may need to send HARQ-ACK, the PSFCH reception (PSFCH-Rx) may be higher priority than the PSFCH reception. The WTRU may perform the higher priority one.

Also regarding HARQ status, the WTRU may need to determine the number of HARQ feedback transmissions. If PSFCH-Tx is for a N1-th retransmission and PSFCH-Rx Is for a N2-th retransmission, a WTRU may perform one of PSFCH-Tx and PSFCH-Rx based on a higher number of N1 and N2. Also, if N1=N2, other conditions may apply to determine between PSFCH Rx and PSFCH Tx.

Regarding the cast type of the associated PSSCH/PSCCH, several examples may apply. For example, if the WTRU needs to receive a PSFCH for groupcast and transmit a PSFCH for unicast, the WTRU may prioritize the PSFCH reception regardless of other parameters.

Regarding the feedback type of groupcast transmission, several examples may apply. For example, the WTRU may prioritize based on whether the feedback is NACK based feedback, which may be considered a first option or Option 1. Further, the WTRU may prioritize based on whether the feedback is ACK/NACK based feedback, which may be considered a second option or Option 2. Also, the WTRU may prioritize based on whether the feedback is a combination of Option 1 and Option 2.

Regarding whether the PSSCH/PSCCH Tx or Rx is in the same slot, in one example if the WTRU transmits PSSCH/PSCCH transmission in the same slot wherein the WTRU may need to perform at least one of PSFCH-Tx and PSFCH-Rx, the WTRU may perform the PSFCH-Tx. Further, if the WTRU receives PSSCH/PSCCH in the same slot, the WTRU may perform PSFCH-Rx. Also, if there is no PSSCH/PSCCH Tx or Rx in the slot, the WTRU may determine PSFCH-Tx or PSFCH-Rx based on other conditions described herein.

Regarding CBR, in an example, if CBR is higher than a threshold, the WTRU may perform PSFCH-Rx and skip transmitting PSFCH in the slot. Otherwise, the WTRU may determine PSFCH-Tx or PSFCH-Rx based on other conditions described herein.

In one example approach, the WTRU may prioritize PSFCH transmission and reception based on the HARQ status of the PSSCH/PSCCH reception. Specifically, if the PSFCH feedback is for ACK, the WTRU may drop the PSFCH transmission to prioritize PSFCH reception. Additionally or alternatively, if the PSFCH feedback is NACK, the WTRU may prioritize PSFCH transmission or perform PSFCH transmission or reception based on QoS of the associated PSSCH/PSCCH transmission.

In another example approach, the WTRU may prioritize PSFCH transmission or reception based on the order of HARQ re-transmission. Specifically, the WTRU may prioritize the PSFCH transmission or reception with the higher index of the associated PSSCH/PSCCH.

In an example situation, a WTRU may determine whether it can transmit multiple PSFCHs in the same slot. The WTRU may determine whether it can transmit multiple PSFCHs in the same slot based on one or any combination of the following: the maximum frequency distance between two PSFCH resources; the power level of each PSFCH; the minimum frequency distance between a PSFCH and the carrier boundary; the maximum power back-off for each PSFCH; and/or, the number of symbols configured for PSFCH resources. In an example, the symbols may be OFDM symbols. In another example, the symbols may be DFT-s-OFDM symbols.

In an example approach, the WTRU may determine the maximum power levels of each PSFCH, when it transmits multiple PSFCHs simultaneously, based the frequency distance between two PSFCHs. Specifically, the WTRU may be configured a set of maximum power back-offs for one PSFCH transmission based on the frequency distance between two PSFCH resources. Based on the configured maximum power back-off value, the WTRU may determine the maximum power level of each PSFCH when it determines whether multiple PSFCHs can be transmitted simultaneously or not. Moreover, the WTRU may determine the required minimum power level of each HARQ feedback, which may be based on one or more of the following: the QoS of the associated PSSCH/PSCCH; the required PSFCH reception power of the WTRU; and/or, sidelink pathloss.

If the maximum power level of each PSFCH resource is greater than its minimum required power level, the WTRU may determine that it can transmit multiple PSFCHs simultaneously. Correspondingly, if the maximum power level of each PSFCH resource is less than or equal to than its minimum required power level, the WTRU may determine that it cannot transmit multiple PSFCHs simultaneously.

In another example approach, the WTRU may determine to transmit multiple PSFCHs simultaneously if the maximum frequency distance between two PSFCH resources is smaller than a threshold. Additionally or alternatively, the WTRU may determine to transmit multiple PSFCHs in the same slot if the minimum frequency distance between a PSFCH and carrier boundary is larger than a threshold.

In another example approach, a WTRU may determine whether more than one PSFCH may be transmitted in the same slot based on the number of symbols configured in the slot containing the PSFCH resource. If Ns symbols are configured for a PSFCH resource, the WTRU may send Ns PSFCHs in the same slot, wherein the symbol location may be determined based on one or more of following: source-id (and/or destination-id) of the WTRU receiving the PSFCH; subchannel index (for example, the first or last subchannel) of the associated PSSCH/PSCCH received; and/or, slot index of the associated PSSCH/PSCCH received.

In one example situation, a WTRU may perform prioritization among multiple PSFCH transmissions based on at least one of HARQ status, QoS of the data, and/or the index of the PSSCH/PSCCH for each TB. A WTRU may have multiple PSFCH-Tx(s) in a slot when the WTRU received multiple PSSCH/PSCCH transmissions associated with the PSFCH slots. In this case, the WTRU may need to prioritize PSFCH-Tx(s) and drop/skip the down prioritized PSFCH-Tx(s).

In one example approach, the WTRU may perform PSFCH transmission prioritization by dropping one or multiple PSFCHs or reducing the power of the non-prioritized PSFCHs. The WTRU may apply similar rules of PSFCH transmission and reception prioritization to perform prioritization among multiple PSFCH transmissions. Specifically, the WTRU prioritization may be determined based on one or more of the following: HARQ status; the index of the associated PSSCH/PSCCH for the HARQ feedback; QoS of the data associated with PSFCH transmission and reception; cast type of the associated PSSCH/PSCCH; feedback type of groupcasttransmission; and/or, time location of associated received PSSCH/PSCCH. In an example, the HARQ status may involve whether the WTRU needs to send ACK or NACK and the number of bits the WTRU needs to send the HARQ feedback to indicate the status of one or multiple TBs.

In a further example, the feedback type of groupcast transmission may include whether the feedback is NACK based feedback. This feedback type may be referred to as a first option or Option 1. Also, the feedback type may include ACK/NACK based feedback. Accordingly, this feedback type may be referred to as a first option or Option 2. Moreover, the feedback type may be a combination of Option 1 and Option 2.

In another example, the time location of associated PSSCH/PSCCH may include a PSFCH-Tx associated with a PSSCH/PSCCH received in slot #n. This PSFCH-Tx may be prioritized higher than a PSFCH-Tx associated with a PSSCH/PSCCH received in slot #n+k, wherein k>0.

In some example situations there may be methods for sensing and resource selection for HARQ based transmission. In an example situation, a WTRU may determine to reserve resources for retransmission of unicast/groupcast TB or not. The WTRU may determine to perform resource reservation for one or multiple retransmissions based on one or any combination of the following: data status in the MAC buffer; QoS of the data; and/or, CBR of the resource pool.

In an example approach, the WTRU may determine to reserve one or multiple resources for HARQ-based retransmission of the unicast/groupcast TB if it has data in the buffer for another TB. This approach may help improve the spectrum efficiency of the system since the reserved resource for HARQ based retransmission may be used for transmission of another TB, and may allow a WTRU to use the reserved resource when HARQ ACK is received.

In another example approach, the WTRU may determine to reserve one or multiple resources for HARQ-based retransmission and/or blind retransmission of the unicast/groupcast TB based on the QoS of the TB. Specifically, if the TB has stringent QoS requirements, the WTRU may determine to reserve the resource for both HARQ based retransmission and blind retransmission. Additionally or alternatively, if the TB has medium QoS requirements, the WTRU may decide to reserve the resource for HARQ based retransmission only. Moreover, if the TB has a low QoS requirement, the WTRU may determine not to reserve the resource for retransmission.

The WTRU may determine the number of reserved resources for transmission(s) of one TB based on the CBR of the resource pool. Specifically, the WTRU may be configured a maximum and a minimum number of reserved resources for each CBR range based on QoS of the data. The WTRU may then determine the exact number of reserved resources for each TB based on its QoS and the CBR of the resource pool. If the CBR is greater than a threshold, the WTRU may determine not to reserve any resources for HARQ based retransmission.

In an example situation, the WTRU may determine to use its HARQ based retransmission resource for another TB based on the QoS of the TB. In an example approach, the WTRU may determine to use the reserved HARQ based retransmission resource for another TB if the QoS of the TB is higher or lower than a threshold. Additionally or alternatively, the WTRU may determine to use the HARQ based reserved resource if the relative QoS between the successfully transmitted TB and the new TB is within a predefined range. Accordingly, in an example, if the relative QoS between two TBs is greater than a threshold, the WTRU may determine to use the HARQ based reserved resource. In another example, if the relative QoS between two TBs is lower than a threshold, the WTRU may determine to use the HARQ based reserved resource.

In a further example situation, the Rx WTRU of the unicast transmission may determine to use the reserved HARQ based retransmission resource(s) of the Tx WTRUs. Specifically, the Rx WTRU after successfully decoding the TB and transmitting the ACK feedback to the Tx WTRU, may determine to use the reserved HARQ based retransmission resource. Accordingly, the Rx WTRU may be configured with one or any combination of the following criteria to reuse such reserved resource: QoS of the TB is greater or smaller than a threshold; relative QoS between two TBs is within a predefined range; Tx-Rx distance is smaller/larger than a threshold; CBR of the resource pool is higher/lower than a threshold; and/or, CQI and/or RI of the reserved resource is higher than a threshold. The Rx WTRU may be configured to send its indication to use the reserved resource to the Tx WTRU implicitly. Such an indication may be sent by using different HARQ feedback resources including time-frequency resource, sequence, or cyclic shift.

In an example situation, when a WTRU performs sensing and resource allocation, it may determine the priority and the RSRP of reserved HARQ based retransmission resources. In another example situation when a WTRU performs sensing and resource allocation, it may determine the priority and the reference signal received quality (RSRQ) of reserved HARQ based retransmission resources. In a further example situation, when a WTRU performs sensing and resource allocation, it may determine the priority and the RSRP/RSRQ/RSSI of reserved HARQ based retransmission resources.

Such information, for example, priority and RSRP/RSRQ/RSSI, may be used to determine the availability of the resource(s) during the resource allocation procedure. The WTRU may determine the priority and the RSRP/RSSI/RSRQ of the reserved HARQ based retransmission resource(s) based on one or any combination of the following: the transmission used to reserve the HARQ based retransmission resource; the priority and RSRP/RSSI/RSRQ of the PSSCH/PSCCH used to reserve the HARQ based retransmission resource; the HARQ feedback status associated with the previous transmission of the TB; and/or the cast type of the TB and the HARQ feedback option used for the TB.

Regarding the transmission used to reserve the HARQ based retransmission resource, the WTRU may determine whether the transmission used to reserve the HARQ based retransmission resource(s) is from the same or a different TB. In an example, resource reselection may also be used.

Regarding the HARQ feedback status associated with the previous transmission of the TB, the WTRU may determine the status associated with the previous transmission of the TB, such as: the WTRU receives HARQ ACK feedback; the WTRU receives HARQ NACK feedback; and the WTRU receives no HARQ information. For the WTRU receiving no HARQ information, this status may be determined by any of the following: the WTRU does not decode the HARQ feedback; the WTRU is not able to decode the HARQ feedback; and the WTRU performs sensing and resource allocation before the HARQ feedback time.

Regarding the cast type, the WTRU may determine whether the reserved HARQ based retransmission resource(s) is for unicast or groupcast. Also, if the resource is for groupcast transmission, the WTRU may further determine which HARQ feedback option is used for the transmission, where such information may be implicitly/explicitly conveyed in SCI.

In an example situation, a WTRU may determine the priority and RSRP/RSRQ/RSSI of the reserved HARQ based retransmission resource based on the resource reservation feature used to reserve the resource. Initially, the WTRU may decode an SCI having priority p and the measured RSRP/RSRQ/RSSI of its PSCCH/PSSCH is E. The WTRU may determine that the priority and RSRP/RSRQ/RSSI of the reserved HARQ based retransmission resource as p and E, respectively if the WTRU uses the reservation for another TB feature to reserve the HARQ based retransmission resource. Additionally or alternatively, the WTRU may determine the priority and RSRP/RSRQ/RSSI of the reserved HARQ based retransmission resource as p+$\Delta$p and E+$\Delta$E, respectively, if the WTRU use the initial transmission or retransmission of one TB to reserve the HARQ based retransmissions resource of the same TB. The values of $\Delta$p and $\Delta$E may be pre-configured, configured or explicitly indicated in the SCI. This example approach may support the adjustment of the retransmission based on the HARQ feedback.

In another example situation, the WTRU may determine priority and RSRP/RSRQ/RSSI of the reserved HARQ based retransmission resource based on the HARQ status of the previous transmission of the same TB. Initially, the WTRU may decode an SCI having priority p and the measured RSRP/RSRQ/RSSI of its PSCCH/PSSCH is E. In an example approach, the WTRU may apply different offsets for priority and RSRP/RSRQ/RSSI if the WTRU receives HARQ ACK and HARQ NACK, respectively for the previous PSSCH/PSCCH transmission of the TB. Additionally or alternatively, the WTRU may determine the reserved HARQ based retransmission resource as available and include it in the set of selectable resources for random selection if the WTRU receives HARQ ACK feedback for the previous PSSCH/PSCCH transmission of the TB. The WTRU may consider the resource as unavailable if it receives HARQ NACK feedback.

In a further example situation, a WTRU may divide the set of selectable resources into two sets, and select the resource for transmission of one TB in one set of the two sets. In an example, one set may contain the resources in the slots having PSFCH and another set may include the slots without PSFCH resources. The WTRU may select one set to select the resources for transmission of one TB. The WTRU may determine which set to select the resource from based on one or more of the following: resource pool configuration; the TB size; QoS of the TB; the number of selectable resources in each set; CBR of the resource pool; and/or, the cast type of the TB.

In an example, the resource pool configuration may include the periodicity of the slot having one or more PSFCH resources. In a further example, if the TB size is larger than a threshold, the WTRU may select the set of resources without PSFCH resources. Otherwise, the WTRU may select any set of resources. In an example regarding the QoS of the TB, if the QoS of the resource pool is smaller than a threshold, the WTRU may select the set of resources having PSFCH resources. Additionally or alternatively, the WTRU may select the set of resources without PSFCH resources. In an example regarding the CBR, if the CBR of the resource pool is smaller than a threshold, the WTRU may select the set of resources without PSFCH resources.

In examples described herein, procedures for HARQ feedback reporting for unknown location information are provided. In an example case, the receiving WTRU may determine to transmit HARQ NACK feedback when it can decode the SCI. The WTRU may perform NACK-based feedback for unicast/groupcast, in which the WTRU may only transmit NACK when it cannot decode the message and the Tx-Rx distance is smaller than the minimum communication range, which may be indicated in the SCI. In contrast, if the location information of the Rx WTRU is not known, the WTRU may transmit NACK when the WTRU cannot decode the message. In an example, the message may be a PSSCH message.

In some example cases, a receiving WTRU may determine not to send HARQ feedback when its location is unknown. Also, in further example cases, a receiving WTRU may determine whether to transmit HARQ feedback based on its past location information. In some example cases, a receiving WTRU may determine to send HARQ NACK feedback based on the location information obtained from the last location information. In an example scenario, the Rx WTRU may determine to use the last location information to compute a Tx-Rx distance associated with a received TB, when the time period between the last location information of the Rx WTRU and the TB transmission may not exceed a threshold. The threshold may be pre-configured, configured or determined by the Rx WTRU based on at least one of WTRU speed, channel condition, and/or QoS requirement. In an example, the QoS requirement may include reliability.

In some further example cases, a receiving WTRU may determine not to send HARQ feedback when its location is unknown and the period to the last time it receives the location information is greater than a threshold. In a further example, a receiving WTRU may determine to send HARQ feedback when its location is unknown but the period to the last time it receives the location information is less than or equal to a threshold.

In some example situations, a WTRU may carry out one or more procedures for resource reservation. In an example situation, a WTRU may determine whether the feature reservation for another TB is allowed or not. Generally, a WTRU may support the feature reservation for another TB, which may allow the WTRU to use a transmission of one TB to reserve the resource for another TB. This feature may include one or any combination of the following: semi-persistent resource reservation; and/or, dynamic resource reservation. In an example, semi-persistent resource reservation may include a procedure in which the SCI associated with one TB in one periodic traffic reserves the resource for another TB in the same periodic traffic. In a further example, dynamic resource reservation may include a procedure in which the SCI associated with one TB reserves the resource for any other TB. In example approaches, the WTRU may indicate in the SCI which type of resource reservation it is using to support other WTRU in the sensing and resource allocation procedure.

The WTRU may be configured to determine whether the feature reservation for another TB is allowed or not based on one or any combination of the following: resource pool configuration; CBR of the resource pool; QoS of the TB; and/or, minimum communication range (MCR). An example involving MCR includes whether a WTRU is inside MCR or outside MCR. In an example, the WTRU may be a receiving WTRU. Also, inside MCR may be referred to as in-MCR, in an example. In a further example, outside MCR may be referred to as out-MCR. If a WTRU is in-MCR, reservation for another TB may be allowed, in an example. Otherwise, reservation for another TB may not be allowed.

The WTRU may be configured with a resource pool with one or any combination of the following cases for a reservation for another TB feature: a first case, which may be referred to as Case-1: SPS resource reservation allowed; a second case, which may be referred to as Case-2: Dynamic resource reservation allowed; and/or a third case, which may be referred to as Case-3: Both SPS and dynamic resource reservation allowed; and/or a fourth case, which may be referred to as Case-4: No resource reservation allowed.

Which case to use for reservation for another TB feature may be determined based on one or more of following: CBR of the resource pool; resource pool configuration; QoS of packet or TB; coverage; MCR; packet size. In an example, coverage may include in-coverage or out-of-coverage. In a further example, MCR may include in-MCR or out-MCR.

In another approach, the WTRU may be configured to enable/disable each feature based on the CBR of the resource pool. For example, the WTRU may be configured to enable both SPS and dynamic resource reservations when CBR<=CRB1; enable SPS resource reservation when CBR1<CBR<=CBR2; enable dynamic resource reservation when CBR2<CBR<=CBR3, no reservation when CBR>CBR3.

In another example approach, the WTRU may be configured to use which type of the resource reservation for another TB feature. For example, the WTRU may be configured to use SPS, dynamic, both SPS and dynamic, or no resource reservation, based on the QoS of the data. For example, the WTRU may be configured to perform dynamic resource reservation for one TB if the priority, reliability, or latency of the TB is smaller or larger than a threshold.

In an example situation, a WTRU may determine the number of resources to report from a physical (PHY) layer to a MAC layer based on whether the feature reservation for another TB is enabled/disabled. For example, a WTRU may determine a first number of resources to report from the PHY layer to the MAC layer based on an enabled feature reservation for another TB. In a further example, the WTRU may determine a second number of resources to report from the PHY layer to the MAC layer based on a disabled feature reservation for another TB.

The WTRU may be configured to determine the set of selectable resource for random selection, based on any one or a combination of the following: whether the feature reservation for another TB is enabled or disabled; and/or, a CBR of the resource pool. In an example, the set of selectable resource for random selection may include the set of resources reported to the MAC layer from the PHY layer.

In an example, the WTRU may be configured to determine the set of selectable resources for a random selection as X % and Y % of the total resources within the resource selection window when the feature reservation for another TB is enabled and disabled, respectively. This approach may allow the WTRU to balance between collision probability and the quality of the selected resources.

In an example situation, the WTRU may determine the number of reserved resources for reach TB by using the feature reservation for another TB based on one or more of CBR, QoS, and/or cast type. The WTRU may be configured a range of the number of reserved resources for each TB based on CBR of the resource pool, QoS of the TB, and/or cast type.

In an example approach, the WTRU may determine to reserve resources for all transmissions of one TB by using the feature reservation for another TB if the CBR of the resource pool is higher or lower than a threshold. However, the WTRU may reserve one resource for either initial transmission or retransmission of a TB by using the SCI associated with another TB if the CBR of the resource pool is lower or higher than a threshold.

In another example approach, the WTRU may determine to reserve one or more resources for all transmissions of one TB by using the feature reservation for another TB for the TB with a high QoS requirement. In examples, a high QoS requirement may include one or more of TB with high priority, high reliability, or low latency. Additionally or alternatively, the WTRU may determine to reserve one resource for either initial transmission or retransmission of the TB with a low QoS requirement by using the feature reservation for another TB. This approach may allow the WTRU to reduce the collision of the TBs with high QoS requirements since all transmission resources of the TB are reserved in advance.

In a further example approach, the WTRU may determine to reserve one resource for the initial transmission of one TB if it is associated with the unicast/groupcast traffic and reserve one or more resources for all transmissions of another TB if it is associated with the broadcast traffic. The WTRU may then perform dynamic resource selection for one or more retransmissions of the TB if the WTRU only reserves the resource for the initial transmission.

In an example situation, a WTRU may determine the sensing window based on which reservation for another TB feature is supported in the resource pool. The WTRU may determine the sensing window in one resource pool based on whether SPS and/or dynamic resource reservation is supported/enabled in the resource pool. Specifically, the WTRU may be configured with multiple resource pools, in which each resource pool may be configured with a sensing window depending on which resource reservation feature is supported in the resource pool.

In some example situations, a WTRU may carry out one or more procedures for resource selection and/or reselection. In an example situation, there may be one or more procedures for resource exclusion. During the resource allocation procedure, the WTRU may determine whether to exclude the resources in the slots it needs to monitor a reserved targeted PSSCH/PSCCH transmission. The reserved targeted PSSCH/PSCCH transmission may belong to the service the WTRU is running. The determination may be based on one or more of the following: the QoS of the TB; the QoS of the reserved targeted PSSCH/PSCCH; the relative QoS between the TB of the WTRU and the TB associated with the reserved PSSCH/PSCCH; the amount of selectable resources before and after excluding the reserved slots; and/or, the CBR of the resource pool.

In an example involving the QoS of the TB, the WTRU may determine not to exclude any slot having a reserved targeted PSSCH/PSCCH if the QoS priority of the TB is higher/lower than a threshold and it may determine to exclude all the reserved PSSCH/PSCCG if the priority of the TB is lower/higher than a threshold. In a further example involving the QoS of the reserved targeted PSSCH/PSCCH, the WTRU may exclude the slots having a reserved targeted PSSCH/PSCCH transmission having QoS of the associated TB greater than a threshold. Otherwise, if the associated TB is smaller than a threshold, the WTRU may not exclude the associated slots. In an example involving the amount of selectable resources before and after excluding the reserved slots, the WTRU may gradually exclude the slots having a reserved targeted PSSCH/PSCCH transmission from the highest priority to the lowest priority until the set of selectable resources is greater than a threshold.

In an example situation, a Tx WTRU may semi-persistently reserve a resource for either aperiodic or periodic traffic. The WTRU may determine one or more of the following parameters for the reserved resources: a validity period of the reserved resources; a minimum and a maximum of the validity period; and/or, a probability of keeping the reserved resources. For example, after each validity period, the WTRU may randomly select one value. If the value is smaller than the probability of keeping the reserved resource, the WTRU may continue to use the reserved resource. Otherwise, the WTRU may perform resource reselection.

These parameters for the reserved resource may be determined based on one or more of the following: resource pool configuration; QoS of the data; and/or, congestion level of the resource pool or the channel occupation of the WTRU. Regarding the QoS of the data, in one example the WTRU may be pre-configured or configured with a mapping between validity periods or a probability of keeping the resource and the priority of the TB. This approach may be motivated to allow the high priority data to keep the resource for a long time to avoid collision with other/low priority data.

In an example situation, a WTRU may divide the resources reserved by other WTRUs into multiple groups and gradually remove each resource in the set of selectable resources or gradually add each resource to the set of selectable resources. Similar to LTE V2X, during the resource allocation procedure, a WTRU may consider all the resources within the resource selection window as the candidate resources. Then, the WTRU may determine the set of non-excluded resources, which may be the set of candidate resources after excluding some resources reserved by other WTRUs. The WTRU may then determine the set of selectable resources by selecting some percentage, for example, 20%, of the candidate resources in the set of non-excluded resources. The WTRU may then randomly select one or multiple resources in the set of selectable resources for its transmission.

In an example which may be applicable to NR V2X, a WTRU may divide the resources reserved by other WTRUs in multiple groups and gradually remove each resource in each group from the set of non-excluded resources or from the set of selectable resources. Additionally or alternatively, the WTRU may gradually add each resource in each group to the set of excluded resources. The adding or removing process may be terminated when one or more of the following conditions are satisfied: the number of non-excluded resources is greater than X % of the total resources; the number of non-excluded resources is greater than X; the number of selectable resources is greater than X % of the total resources; the number of selectable resources is greater than X; the number of excluded resources is greater than X % of the total resources; and/or, the number of excluded resources is greater than X.

The criteria to separate the reserved resources to different groups may be determined based on one or more of the following: the QoS of the reserved resource; the timing of the possible collision; and/or, the type of reserved resources. Regarding the QoS of the reserved resource, the WTRU may divide the reserved resources to high QoS resources and low QoS resources. Regarding the type of reserved resources, in one example the WTRU may divide the set of reserved resources to one of the following: the group of the dynamic reserved resource; the group of semi-persistently reserved resources; and/or the group of feedback based HARQ retransmission resource. In an example, the group of the dynamic reserved resources may be used for one transmission of one TB. Also, the group of semi-persistently reserved resources may be used semi-statically for multiple transmissions. Further, the group of feedback based HARQ retransmission resource may be used for feedback based HARQ retransmission.

In an example approach, the WTRU may divide the set resources reserved by other WTRUs into multiple groups, in which the set of groups may contain at least the group of low QoS, such as, for example, priority, resources and the group of high QoS resources. The WTRU may gradually add the resources in the group of low QoS resources and then add the resources in the group of high QoS resources to the set of excluded resources until the adding condition is satisfied. Additionally or alternatively, the WTRU may gradually remove the resources in the group of high QoS and then remove the resources in the group of low QoS from the set of selectable resources until the removing condition is satisfied. This approach may be motivated to allow the WTRU to avoid selecting the reserved resources from the high QoS data.

In another example approach, the WTRU may divide the set of reserved resources into at least two groups, in which the first group may include the reserved resources having potential collision in the first window, for example, the resource selection window, and the second group may include the reserved resources having potential collision in the second window, for example, the window having a resource reservation window. The WTRU may sequentially add the reserved resources in the second group and in the first group into the set of excluded resources. This approach may be motivated to allow the WTRU to prioritize the current transmission over future transmission.

In an example situation, a WTRU may determine the thresholds to exclude the reserved resources during a resource selection procedure. The WTRU may exclude the resource reserved by another WTRU if the sidelink-RSSI (SL-RSSI) or RSRP of the resource is greater than a threshold. The threshold may be determined based on one or more of the following: QoS of the TBs; congestion level of the resource pool; and/or the type of reserved resource.

Regarding the QoS of the TBs, similar to LTE V2X, the threshold to determine the availability of the resource pool may be determined based on the priority of the reserved TB and the priority of the pending TB. However, the threshold may be additionally determined based on the minimum communication range of the pending TB and/or the minimum communication range for the TB of the reserved resource.

Regarding the congestion level of the resource pool, specifically, the WTRU may be configured with different thresholds based on the CBR range of the resource pool. For example, the WTRU may be configured with a threshold for the first CBR range and the threshold for the second CBR range may be determined by an offset to the threshold of the first CBR range.

Regarding the type of reserved resource, in one example the WTRU may be configured with one threshold for each of the following reserved resources: the reserved resource for blind retransmission; the reserved resource for feedback-based blind retransmission; and/or, the reserved resource for the initial transmission.

In further example situations, methods to consider slots are provided. In examples, methods to consider the non-monitored slots may be considered.

Figure 2:
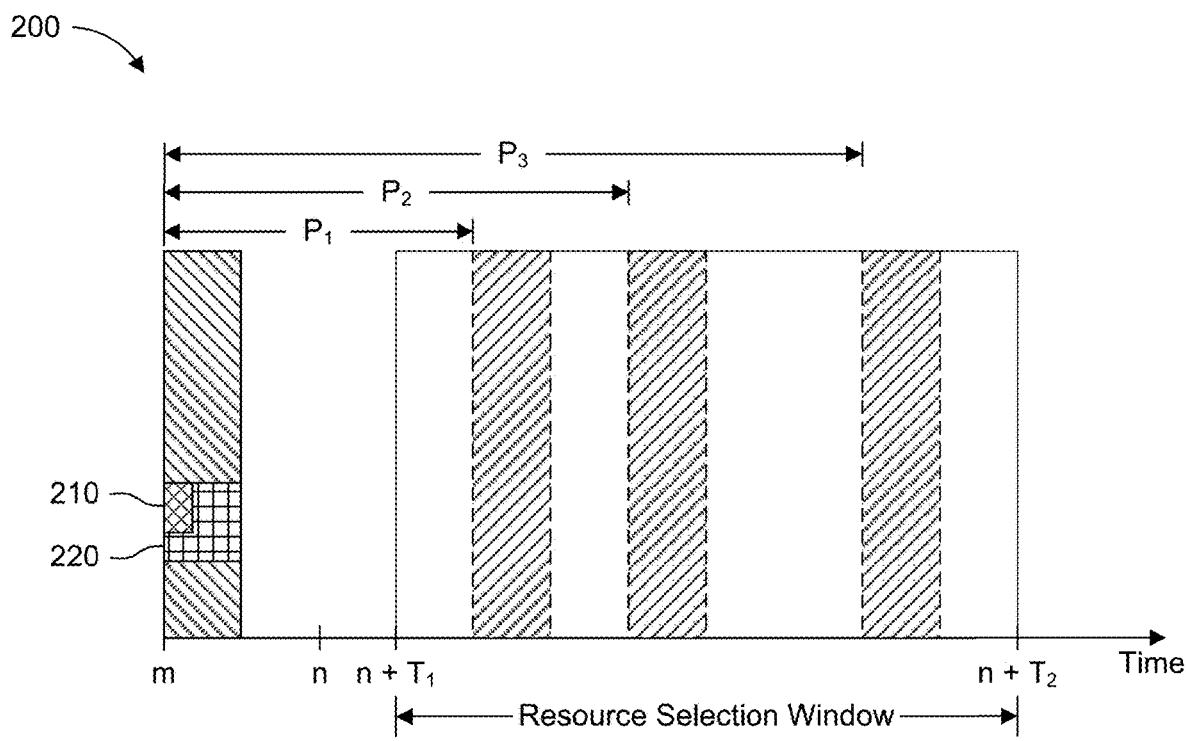
FIG. 2 is a diagram illustrating an example of potentially reserved slots when a WTRU is not monitoring in one slot.

FIG. 2 is a diagram illustrating an example of potentially reserved slots when a WTRU is not monitoring in one slot. Generally, a WTRU may determine the availability of potentially reserved slots when one slot is not monitored. As shown in the example of diagram 200, the slot beginning at time m may be referred to as slot m. Further, slot m may include transmission resources, such as transmission resources 210 and 220, in which the resource 210 may be used for control transmissions and the resource 220 may be used for data transmissions. The WTRU may trigger resource selection at slot n to select the transmission resources in the resource selection window [n+T1, n+T2], in an example. In a further example, the WTRU may exclude the slots having the time gap P1, P2, P3 with slot m.

In a specific example, when the WTRU does not monitor in slot m, the WTRU may consider the slot m+k*$P_i$ as the potentially reserved slots, where k is an integer and $P_i$ is all possible reservation periods supported in the resource pool. In examples shown in FIG. 2, $P_i$ may include at least $P_1$, $P_2$ and $P_3$.

In an example approach, the WTRU may determine the availability of any potentially reserved slot during the resource allocation when the WTRU does not monitor in one slot. In an example, the WTRU may not monitor in a slot when the WTRU needs to transmit in the slot. The availability of one potentially reserved slot may be determined based on one or more of the following: the CBR of the resource pool; the QoS of the TB; and/or, the traffic type of the TB.

Regarding the CBR of the resource pool, in an example, the WTRU may determine one potentially reserved slot as unavailable when CBR is of the resource pool is greater than a threshold. In contrast, the WTRU may determine the potentially reserved slot as available when the CBR of the resource pool is smaller than a threshold. If the WTRU considers the potentially reserved slots as available, the WTRU may include the resources in these slots for the set of selectable resources. Conversely, if the WTRU considers these slots as unavailable, the WTRU may exclude the resources in these slots in the set of selectable resources.

Regarding the QoS of the TB, in an example, the WTRU may determine one potentially reserved slot as either available or unavailable if the priority/latency threshold of the TB is exceeded. In a further example, only the priority threshold may be used. In another example, only the threshold example may be used.

Regarding traffic type of the TB, this basis for determination may be appropriate for where the WTRU determines one potentially reserved slot as available/unavailable based on whether the dynamic or semi-persistent resource selection. Specifically, the WTRU may determine the potentially reserved slots as available if the WTRU performs dynamic resource selection, and the WTRU may determine the potentially reserved slots as unavailable if the WTRU performs resource selection for semi-persistent usage.

In example situations, a WTRU may perform one or more procedures for resource ranking, as provided herein. In an example approach, the WTRU may divide the set of resources in the resource selection window to multiple groups, each of which may be associated with one resource group rank. Then the WTRU may perform ranking the resource within each group. Specifically, the WTRU may divide the resource set of resource in the resource selection window to any combination of the following groups or more: a first group, which may be referred to as group 1, and which may comprise of the set of resources unreserved by other WTRUs or itself; and/or, a second group, which may be referred to as group 2, and which may include the set of resource reserved by other WTRUs.

In an example, a WTRU may perform ranking for the resources in the group of the resources reserved by other WTRUs based on the increasing or decreasing value of f(QoS)*g(RSRP/RSRQ/RSSI)]. In an example approach, the WTRU may perform ranking of the resources in the group of the resources reserved by other WTRUs based on the increasing or decreasing value of f(QoS, RSRP or RSRQ). For example, the WTRU may rank the reserved resource in the groups based on the value of P/RSRP, in which the high ranked resources, which may not selectable, may be associated with the low value of P/RSRP.

In a further example, a WTRU may gradually include the resource in one group to the set of selectable resources. In one approach, a WTRU may sequentially select one group from the lowest-ranked to the highest-ranked and then gradually include each resource in each group from lowest-ranked to the highest-ranked until the number of selectable resources is greater than a threshold. Additionally or alternatively, the WTRU may sequentially select one group from the highest-ranked to the lowest-ranked and then may gradually exclude each resource in each group from the highest-ranked to the lowest-ranked until the number of excluded resources is greater than a threshold.

In example situations, a WTRU may perform one or more procedures for determining resource selection windows. In an example approach, the WTRU may determine the resource selection window of the next resource for one TB based on the time resources of the previously selected resource(s) and the maximum reservation signaling between two resources. Specifically, for the first selected resource of the TB, similar to LTE V2X, the WTRU may determine the resource selection window as [n+T1, n+T2], where the value of T1 may be determined based on the WTRU capability and the value of T2 may be determined based on the latency and reliability of the TB. We may assume that the WTRU soonest and the latest time of the previous selected resources as n+Tmin and n+Tmax, respectively, where Tmin=Tmax when the WTRU selects the first resource for retransmission. Also, we may assume that the maximum reservation signaling between two resources is N. The WTRU may determine the resource selection window for the following resource as [min (n+Tmin−N, n+T1), max (n+Tmax+N, n+T2)].

In another example approach, the WTRU may determine a fixed selection window size for one transmission and the resource selection window for the next transmission may be determined based on the selected resource of the previous transmission. In an example approach, we may assume that the WTRU may select the slot for the previous transmission of the TB as n+k, and the WTRU may determine the resource selection window for the next transmission as [n+k, n+k+C]. The WTRU may determine the resource selection window for the initial transmission as [n+T1, n+T1+C]. In another example approach, the WTRU may determine the resource selection window for one transmission in the window [n+T1+(k−1)*C, n+T1+k*C], where k is an integer value. In both example approaches, C may be fixed or may be configured based on one or any combination of the following: QoS of the TB; and/or, CBR of the resource pool.

In an example situation, a WTRU may determine to perform which type of resource selection for unicast/groupcast TB. The WTRU may support one or more of the following resource allocation types for unicast/groupcast TB: HARQ based retransmission only; and/or a combination of blind and HARQ based retransmissions.

Regarding a HARQ based retransmission only, the resource for the next transmission of a TB may occur before the HARQ feedback time of the previous transmission. Regarding a combination of blind and HARQ based retransmissions, the next transmission of a TB may occur before or after the HARQ feedback time of the previous transmission.

The WTRU may determine to perform one resource selection type based on one or more of the following: the QoS of the TB; the pool configuration; the time gap between PSSCH/PSCCH and its associated PSFCH; and/or, the time gap between PSFCH and the next HARQ-based PSSCH/PSCCH retransmission. In examples, the QoS of the TB may include priority, latency, and reliability. In an example, if the latency is larger than a threshold, the WTRU may perform HARQ based retransmission only resource selection. Additionally or alternatively, if the latency is smaller than a threshold the WTRU may perform a combination of blind and HARQ based retransmission.

In some example situations the WTRU may determine the selection window for the next resource based on the result of the previous selected resource for HARQ based retransmission only resource allocation type. The WTRU may determine the resource selection window for the resource as [n+T1, n+T2]. The value of T2 may be determined based on the latency of the TB and the number of transmissions required for the TB. We may assume that the WTRU selects the first resource at slot n+k, the associated PSFCH at subframe n+k+a. The WTRU may determine the resource selection window for the next resource as [n+k+a+Δ, n+T2], where Δ may be fixed based on the time gap between PSFCH and the next HARQ-based PSSCH/PSCCH retransmission. If n+k+a+Δ>n+T2, the WTRU may finish the resource selection procedure.

In an example situation, a WTRU may determine the selection window for the initial transmission resource and the HARQ based retransmission resource. In an example approach, the WTRU may determine the resource selection window for the initial transmission and the HARQ based retransmission as [n+T1, n+T3] and [n+T3, n+T2], respectively, where the value of T2 may be determined based on the latency requirement of the TB and the value of T3 may be fixed or it may be determined based on one or more of the following: the number of selectable resources; QoS of the TB; CBR of the resource pool; and/or the QoS of the TB; and/or, CBR of the resource pool. Regarding the QoS of the TB, the value of T3 may be determined as half of the latency requirement of the TB.

Specifically regarding the number of selectable resources, the value of T3 may be determined such that the number of selectable resources is greater than a threshold within [n+T1, n+T3]. Additionally or alternatively, the value of T3 may be determined such that the number of selectable resources in the window [n+T1, n+T3] is greater than X % the total number of selectable resources in the window [n+T1, n+T2]. The value of X may be fixed or determined based on one or more of the following: the QoS of the TB, and/or the CBR of the resource pool.

In another example approach, the WTRU may determine the first and the second resource selection windows are [n+T1, n+T3] and [n+k+a+A, n+T2], where n+k and n+k+a are the slot for the initial transmission and its associated PSFCH, respectively. The value of A may be fixed based on the time gap between PSFCH and the next HARQ-based PSSCH/PSCCH retransmission.

In an example situation, the WTRU may determine to change from HARQ based retransmission only resource allocation type to the combination of blind and HARQ based retransmissions resource allocation type based on the availability of the selectable resources. Specifically, during the resource selection procedure of HARQ based retransmission only resource allocation type, if the amount of selectable resources within the resource selection window is smaller than a threshold, the WTRU may switch to the combination of blind and HARQ based retransmission resource to guarantee the QoS of the TB.

In an example situation, the WTRU may determine which PSFCH resource to feedback the status of multiple PSSCH/PSCCH transmissions for transmission of one or multiple TB based on the timing of the PSFCH resource. For example, the WTRU may receive one PSSCH/PSCCH transmission and one PSSCH/PSCCH blind retransmission of one TB, in which each PSSCH/PSCCH transmission may be associated with one PSFCH resource. Further, the WTRU may need to determine which PSFCH resource to feedback the HARQ status of these PSSCH/PSCCH transmissions. The WTRU may determine which PSFCH resource to feedback the status of multiple PSSCH/PSCCH transmissions based on the timing of the PSFCH resource. Specifically, in one approach, the WTRU may select a PSFCH resource associated with the first PSSCH/PSCCH transmission if it has enough time to decode both PSSCH/PSCCH transmissions and prepare HARQ feedback; otherwise, the WTRU may select the PSFCH associated with the second PSSCH/PSCCH transmission. In another approach, the WTRU may use the PSFCH associated with the second PSSCH/PSCCH.

In an example situation, a WTRU may determine the time slot to transmit the initial transmission message based on the selected resource for the initial transmission and QoS of the TB. For example, the WTRU may need to determine the time slot to transmit an initial transmission reservation message to reserve the resource for an initial transmission of a TB. The WTRU may be configured with different sets of time gaps between the reserved PSSCH/PSCCH resource and the initial transmission indication transmission. The time gap range may be determined based on the QoS, such as, for example, the priority of the TB. This approach may be reduce the collision between the low priority and high priority TBs since WTRUs having different priority may receive the reservation message from each other and may perform collision avoidance if necessary.

In an example situation, a WTRU may determine two resource selection windows for initial transmission and one or more retransmissions. For example, a WTRU may determine two resource selection windows in which one window may be used for resource selection of the initial transmission and another window may be used for resource selection of one or multiple retransmissions. Moreover, the WTRU may use the transmission of the initial transmission in the first resource selection window to reserve the resource for the retransmission in the second resource selection window.

In an example approach, the WTRU may determine that the first and second resource selection windows are [n+T1, n+T3] and [n+T3, n+T2], respectively. In another approach, the WTRU may determine the first and the second resource selection windows are [n+T1, n+T3] and [n+k+Δ, n+T2], where n+k is the slot for the initial transmission and Δ may be determined based on the WTRU processing capability. In both approaches, the values of T2 and T3 may be determined based on the QoS of the TB and CBR of the resource pool. Specifically, the value of T2 may be determined based on the latency requirement of the TB and the CBR of the resource pool. The value of T3 may be determined based on the latency requirement, reliability of the TB and/or the CBR of the resource pool.

In an example situation, a WTRU may perform a resource contention procedure for the initial transmission in the first resource selection window and use the SCI of the initial transmission to reserve the resources for one or multiple retransmissions in the second resource selection window. Specifically, the resource contention procedure may include one or more of the following procedures: a back-off procedure; and/or, a clear channel assessment (CCA) procedure.

For the back-off procedure, the WTRU may generate a back-off value after resource allocation is triggered. The WTRU then may decrease the back-off until the back-off value is equal or smaller than zero. The back-off value may be decreased when the WTRU determines that one or multiple resources in the slot is available for its transmission.

For the CCA procedure, the WTRU may determine the availability of one or multiple resources by measuring the received signal strength (RSS) of these resources.

In an example situation, a WTRU may perform a random selection of the selectable resources for the retransmission in the second resource selection window. The set of selectable resources may be determined by a similar resource selection procedure as in LTE V2X. Specifically, the set of selectable resources may be determined after excluding the resources reserved by other WTRUs and selecting the best resources after ranking the remaining resources.

In examples provided herein the WTRU may perform resource reselection. In an example situation, the WTRU may perform resource reselection for a set of reserved resources if the resource utilization of the reserved resources is smaller than a threshold. Specifically, the WTRU may be configured with a resource utilization threshold for one set of reserved resources corresponding to one sidelink process. The utilization threshold may be configured based on the QoS of the data and/or CBR of the resource pool. The WTRU may determine the resource utilization of one set of reserved resource as the ratio of the used resources and unused resource within a period.

In an example approach, the WTRU may perform resource reselection for a set of reserved resources for unicast/groupcast if the successful transmission ratio is smaller than a threshold. The Tx WTRU may consider a transmission as successful if it receives HARQ ACK feedback. The WTRU may consider the transmission as a failure if it receives HARQ NACK or no feedback from the Rx WTRU.

In another example approach, if the WTRU is working in network scheduled mode, the WTRU may report the resource utilization to the network to support the network in scheduling. Additionally or alternatively, the WTRU may report the transmission successful rate to the network based on HARQ feedback from the receiver WTRU. The reporting in both approaches may be configured periodically or based on a triggering condition. The triggering condition may include, for example, when the utilization or the transmission successful rate of a set of reserved resources is smaller than a threshold.

In some example situations, a WTRU may perform resource evaluation, re-evaluation or both. According to the initial design of NR V2X, the WTRU may perform resource evaluation or re-evaluation for the resource selected and/or reserved by the WTRU to determine whether it needs to reselect the resource due to potential collision with other WTRUs.

In an example, the WTRU may determine whether to trigger resource re-evaluation for a set of selected resources. In an example approach, the WTRU may determine whether it needs to trigger resource re-evaluation or not for a set of the selected one or more resources based on one or any combination of the following: the time between the slot when it selects the resource and the slot of the first selected resource; and/or the remaining delay budget of the TB.

In an example, the WTRU may determine whether to trigger resource re-evaluation or not based on the time between the slot when it selects the resource and the slot of the first selected resource. Specifically, in an example, the WTRU may trigger resource re-evaluation if the time between the slot it selects the resource and the slot of the first selected resource is smaller than a threshold. Otherwise, the WTRU may not trigger resource re-evaluation. The threshold may be determined based on one or any combination of the following: a fixed, configured or preconfigured threshold; the QoS of the TB; and/or, CBR of the resource pool. For example, the WTRU may be configured or preconfigured with the time-gap threshold based on the CBR of the resource pool. Specifically, the WTRU may be configured or preconfigured with a long time-gap threshold if CBR is low and short time-gap threshold if CBR is high. In an example related to a fixed, configured or preconfigured threshold, the time-gap threshold may be a fixed value, configured or pre-configured per resource pool. In an example related to the QoS of the TB, the time-gap threshold may be configured or pre-configured based on the priority of the TB. For example, the WTRU may be configured or preconfigured with a short time-gap threshold for high priority TBs and a long time-gap threshold for low priority TBs.

In another example, the WTRU may determine whether it needs to perform resource re-evaluation or not based on the remaining delay budget of the TB. Specifically, in an example, the WTRU may trigger resource re-evaluation if the remaining delay budget of the TB is larger than a threshold. Otherwise, the WTRU may not trigger resource re-evaluation. The delay budget threshold may be determined based on one or any combination of the following: a fixed, configured or preconfigured threshold; CBR of the resource pool; and/or, resource reselection type of the TB. For example, the WTRU may be configured or preconfigured a high delay budget threshold for HARQ-based retransmission and low delay budget threshold for blind retransmission. Regarding the CBR of the resource pool, in an example, the WTRU may be configured or preconfigured with the delay budget threshold based on the CBR of the resource pool. For example, the WTRU may be configured or preconfigured with a high delay budget threshold if CBR is low and with a low delay budget threshold if CBR is high.

Further, this approach may be allow the WTRU to be able to select enough available resources after resource re-evaluation. In an example related to a fixed, configured or preconfigured threshold, the delay budget threshold can be a fixed value, configured or preconfigured per resource pool.

In an example approach, the WTRU may trigger the resource re-evaluation in a slot between the slot in which the WTRU first selects the resource and the slot of the use of first selected resource. The WTRU may determine the resource re-evaluation triggering timing based on one or any combination of the following: QoS of the TB, and/or, CBR of the resource pool. In an example regarding the QoS of the TB, the WTRU may be configured or preconfigured with a maximum and/or minimum time-gap between the first selected resource and the re-evaluation trigger based on QoS of the TB, and the WTRU may then determine the resource re-evaluation timing to satisfy the configured or preconfigured time-gap. Further, in an example regarding the CBR of the resource pool, the time-gap between resource re-evaluation trigger and the first selected resource may be large if the CBR of the resource pool is low and small if the CBR of the resource pool is high.

The WTRU may determine the value of a time gap, in an example. In an example instance, the WTRU may be configured or preconfigured with a time gap. The time gap may be referred to as T3, for example. In an example instance, the WTRU may be configured or preconfigured with a time-gap T3 between the maximum resource re-evaluation timing and the first selected resource. The value of T3 may be determined based on the QoS of the TB and/or CBR of the resource pool. Specifically, T3 may be large for low priority TB and small for high priority TB.

In an example approach, a WTRU may change one or more resources from the previous iteration to one or more resources from current iteration. After resource re-evaluation, the PHY layer of the WTRU may report a set of selectable resources, for example, set A, to the MAC layer, then the MAC layer may randomly select one set of resources for transmissions of the TB. The MAC layer of the WTRU may randomly reselect the set of resources for retransmission. The MAC layer may perform resource selection if one or more of the previously selected resource is not in the set of selectable resources. If the MAC layer determines to perform resource selection, it may perform one or any of the following: reselect at least one of the collided resources only; and/or, reselect the whole set of the previously selected resources. The reselection may be performed based on an association, in an example. For example, the reselection may be performed based on an association with an originally selected resource. Further, the reselection may be performed based on an association with a first resource.

The WTRU may determine whether to reselect at least one of the collided resources only or the whole set of the previously selected resources based on one or any combination of the following: transmission type of the TB, and/or, QoS of the TB. Regarding transmission type of the TB, in an example, the WTRU may determine to reselect the whole set of the previously selected resources if the WTRU uses HARQ based retransmission for the TB. In a further example, the WTRU may determine to reselect the whole set of the previously selected resources if the WTRU uses HARQ based retransmission for the TB and reselect the at least one of the collided resources only if blind retransmission is used for the TB. According, the WTRU may determine to reselect additional resources based on the HARQ status of the first resource. Further, regarding the QoS of the TB, in an example, the WTRU may determine to perform resource selection for the at least one of the collided resources only if the priority of the TB is higher than a threshold. Otherwise, the WTRU may perform resource selection for the whole set of the previously selected resources.

In an example approach, the WTRU may determine to reselect at least one of the collided resources only. The WTRU may then randomly reselect one or more resources for transmission based on the number of collided resources. The WTRU may then determine the window to reselect one or more resources based on the timing of the remaining resources and the HARQ round trip time (RTT). For example, if the WTRU performs resource reselection for the first resource in the set of resources for HARQ based retransmission TB, the WTRU may exclude the set of selectable resources within the HARQ RTT from the second resource.

In an example instance, when the WTRU needs to perform resource selection for unicast and/or groupcast traffic, the WTRU may select the resource based on the availability of the CSI report. Specifically, if the CSI measured in one set of subchannels is available, the WTRU may perform resource selection in that set of subchannels having relevant CSI reporting, in an example. Otherwise, if no CSI reporting or wideband CSI reporting is available, the WTRU may perform resource selection in the whole resource pool. In another example approach, the WTRU may apply different set of RSRP thresholds between the resources having a CSI report and resources not having a CSI report.

In another example approach, the WTRU may determine when to stop RSRP increment when it performs resource evaluation or reevaluation to determine the set of selectable resource. Specifically, the WTRU may be configured or preconfigured with the maximum RSRP thresholds and/or with the maximum number of RSRP increments during the resource reevaluation procedure. The maximum RSRP thresholds and/or the maximum number of RSRP increments may be determined based on one or any combination of the following: a configured or preconfigured increment, QoS of the TB, and/or CBR of the resource pool.

In an example regarding the configured or preconfigured increment, the WTRU may be configured or preconfigured with a fixed number of RSRP increment. Further, the WTRU may then stop RSRP incrementing when the number of RSRP increments reaches the threshold.

Regarding the QoS of the TB, in an example, the WTRU may be configured or preconfigured. For example, the WTRU may be configured or preconfigured with the maximum number of RSRP increments based on priority of the TB. Further, the WTRU may be configured or preconfigured with a high value of the maximum number of RSRP increments for high priority WTRU and low value of the maximum number of RSRP increment for low priority TB.

Regarding the CBR of the resource pool, in an example the WTRU may be (pre-)configured with a high value of the maximum number of RSRP increments if the CBR of the resource pool is high. Further, the WTRU may be configured or preconfigured with a low value of the maximum number of RSRP increment if the CBR of the resource is low.

In example situations, a WTRU may perform resource selection for burst traffic. In an example approach, the WTRU may perform resource selection for burst traffic by performing Resource Contention for each TB in one subband. Specifically, the WTRU may divide the frequency domain of the resource pool in to multiple subbands, in an example. The bandwidth of each subband may depend on the size of each TB in the burst traffic. The WTRU may then perform the Resource Contention procedure for each TB in one subband independently.

In another example approach, the WTRU may perform clear channel assessment (CCA) and occupy one or multiple subbands to transmit one or multiple TBs. This approach may allow the WTRU to reduce the CCA overhead since the WTRU may need to perform CCA once for one or more transmissions of one TB or multiple TBs.

The WTRU may determine the maximum channel occupancy time (MCOT) for each time it accesses the channel, or the WTRU may determine the MCOT for a period. The MCOT may be determined based on one or any combination of the following: the number of TBs required for resource allocation; the QoS of each TB; the bandwidth of the occupied resource; and/or, the CBR of the resource pool. For example, the WTRU may be configured for the higher MCOT if the CBR is low but lower MCOT if CBR is high. In an example regarding the QoS of each TB, the WTRU may determine the MCOT based on the number the number of transmissions for one TB, which may be determined based on the reliability of the TB. Regarding the bandwidth of the occupied resource, the WTRU may be configured a smaller MCOT if it uses higher bandwidth to balance between time and frequency resource usage, in an example.

In an example approach, the WTRU may combine a backoff procedure for multiple TBs. For example, the WTRU may determine to perform the resource allocation for burst traffic by determining one or both of the following for the burst traffic: the range of the back-off counter; and/or the value of the back-off counter.

The WTRU may then sequentially perform a back-off procedure for each TB. This approach may allow the WTRU to find an early resource for transmission. The range of the back-off counter or the value of the back-off counter may be determined based on one or more of the following: the number of TBs required for the resource allocation; the QoS of each TB; and/or, the CBR of the resource pool.

For example, the WTRU may be configured to randomly select one back-off value for one TB in the range [0, N] if it performs a resource selection procedure for one TB. However, when the WTRU performs a resource selection procedure for two TBs in the burst traffic, the WTRU may sequentially select one back-off value for the first TB and the second TB in the range [0, N/2].

In example situations, a WTRU may perform resource selection supporting congestion control. In an example approach, a WTRU may determine a set of non-selectable resources. Specifically, the WTRU may determine an RSRP/RSRQ/RSSI threshold to determine whether one resource is selectable or not, in an example. The threshold may be determined based on one or more of the following: the QoS of the reserved resource; the QoS of the pending TB; and/or, the CBR of the resource pool.

In an example approach, the WTRU may determine the set of non-selectable resources if the set satisfies the following: the set is reserved by one SCI; and/or, the measured RSRP/RSRQ/RSSI of the PSSCH/PSCCH used for reserving the resource set is greater than a threshold. In a further example, the threshold may be configured or preconfigured based on the relative priority of the two TBs.

In another example approach, the WTRU may determine the set of non-selectable resources if it is reserved by one SCI and the priority indicated in the SCI is one or more of the following: lower than a threshold; and/or, lower than the priority of the pending TB minus A. Further, in an example, the value of A may be configured or preconfigured.

In an example situation, the WTRU may determine to perform congestion control by doing one or more of the following if the number of selectable resources is smaller than a threshold or the number of non-selectable resources is greater than a threshold: adjust the transmission parameters; drop the TB; and/or pre-empt one or multiple resources. In an example, adjust the transmission may include one or more of: change the transmission power, such as, for example reduce the transmission power; change the number of subchannel selected per transmission; and/or change the modulation and coding scheme (MCS). The threshold to perform congestion control may be fixed or determined based on the QoS of the TB and/or the CBR of the resource pool.

In example situations a WTRU may perform one or more methods for pre-emption. In one approach, a WTRU may determine which resource pool is possible and which type of reserved resources are allowed for pre-emption. The WTRU may determine any combination of the following for pre-emption in the resource pool based on the pool configuration which may be configured or preconfigured in the WTRU or send to a WTRU via SIB or RRC: whether pre-emption is allowed or not; the priority range or another QoS parameter range of a TB that the WTRU can perform pre-emption; the priority range or another QoS parameter range of the reserved resource, which can be pre-empted; the minimum priority difference or any QoS parameter difference of the pending TB and the reserved resources allowed for pre-emption; the CBR threshold allowed for pre-emption; and/or, a set of source-id and/or destination-id that may be associated with a reserved resource which may be pre-emptible.

In an example approach, the WTRU may be configured with different sets of priorities that allowed it to pre-empt a reserved resource based on the CBR of the resource pool. Specifically, for one TB, the WTRU may determine whether it can perform pre-emption based on the priority of the TB and the CBR of the resource pool, in an example.

In another example approach, the WTRU may determine whether pre-emption is allowed based on the CBR of the resource pool. Specifically, if the CBR is greater/lower than a threshold, pre-emption may not be allowed, in an example. Otherwise, if the CBR is smaller/greater than a threshold, pre-emption may be allowed.

In an example situation, a WTRU may determine the set of resources allowed to be preempted based on the property of its TB and the property of the reserved resource. Specifically, in an example, the property of the pending TB may include one or more of the following: the QoS of the TB; the cast type of the TB; and/or, the size of the TB.

Moreover, the property of the reserved resources may include any combination of the following: the QoS of the reserved resources; the cast type of the reserved resource; the size of the reserved resource; the reserved resource is a HARQ-based initial transmission; the reserved resource is a HARQ based re-transmission; the reserved resource is a blind retransmission; and/or, the reserved resource is an initial blind transmission.

In an example approach, the WTRU may determine whether the resource is allowed to be preempted or not based on the QoS of its TB and the QoS of the reserved resources. The WTRU may be configured to pre-empt the resources having priority or other QoS information within a range or having the priority difference or other QoS parameter different with the WTRU's pending TB larger than a configured or preconfigured threshold. Additionally or alternatively, the WTRU may be configured to pre-empt one or multiple resources which have the lowest priority or the largest priority difference with its pending TB.

In another example approach, the WTRU may determine to pre-empt resources associated with one or multiple cast type based on the cast type of the pending TB. For example, if the pending TB is unicast, it may be allowed to pre-empt the unicast traffic only. Additionally or alternatively, if the pending TB is broadcast, it may be allowed to pre-empt all cast types of the reserved resources.

In an example situation, a WTRU may determine which type of pre-emption based on the characteristic of the TB. One such pre-emption may be semi-persistent based pre-emption, where the WTRU may pre-empt the reserved resource and use the pre-empted resource semi-persistently. Additionally or alternatively, the pre-emption may be dynamic based pre-emption, where the WTRU may pre-empt the reserved resource and use the pre-empted resource for one shot transmission.

The WTRU may determine the type of pre-emption in the pre-emption indication message, in which one bit in the pre-emption indication message may be used to indicate which type of the pre-emption may be used. Regarding the duration of the pre-empted resource, the WTRU may determine to perform one of the following: slot-based pre-emption; and/or, symbol-based pre-emption.

The duration of the pre-empted resource may be determined based on one or any combination of the following: the QoS of the pending TB; the size of the pending TB; the information conveyed in the TB; and/or, the frequency size of the reserved resource.

In one example approach, the WTRU may perform symbol-based pre-emption if the size of the TB is smaller than a threshold. Additionally or alternatively, the WTRU may perform symbol-based pre-emption for the TB conveying the information such as CSI reporting, PC5-RRC, and the like. This approach may allow the WTRU to pre-empt less time resources for small TBs.

The WTRU may indicate its pre-emption type in the pre-emption message to support the receiver WTRUs in the sensing and resource selection procedure, in an example. Specifically, for example, the WTRU may implicitly/explicitly indicate whether the pre-emption type is either semi-persistent-based or dynamic based. Moreover, the WTRU may further indicate the pre-emption is either symbol-based or slot-based, in an example.

In an example, a WTRU may implicitly or explicitly signify the set of pre-empted WTRUs by indicating the pre-empted resource. In an example approach, the WTRU may implicitly signify the set of pre-empted WTRUs by indicating the pre-empted resources in the pre-emption message. The receiver WTRU, after successfully decoding the pre-emption message, may identify whether it is pre-empted or not by identifying whether any of its reserved resources is overlapped with the pre-empted resource. In another example approach, the WTRU may explicitly indicate the set of pre-empted WTRUs and the pre-empted resource in the pre-emption message.

In an example situation, a WTRU may determine the resource to send and monitor for a pre-emption message. In an example approach, the WTRU may be configured to send the pre-emption message in the subchannels/slots/symbols dedicated to a PSCCH. The WTRU may determine the pre-emption message by the SCI format dedicated to the pre-emption, in an example.

In another example approach, the WTRU may be configured one or multiple resource pools to send the pre-emption message. Additionally or alternatively, the WTRU may be configured dedicated subchannels/slots to send pre-emption messages. The receiver WTRU may monitor the dedicated resources for pre-emption indication to determine whether its reserved resource is pre-empted or not and to support the sensing and resource allocation procedure.

In another example approach, the WTRU may be configured with a rule regarding the time gap between the pre-emption indication transmission and the data transmission. The time gap between the pre-emption indication and the data transmission may be configured or preconfigured based on a resource pool. The configured or preconfigured value may be determined based on the time required for the WTRU to decode the pre-emption indication and cancel its transmission. Additionally or alternatively, it can be configured based on one or any combination of the following: the QoS of the pre-empted resource; the QoS of the pending TB; and/or, the CBR of the resource pool.

In an example approach, the WTRU may be configured with the time gap between the pre-emption indication and the data transmission based on the QoS of the pre-empted resource. Therefore, the pre-empted WTRU may monitor the pre-emption indication in the configured slot for pre-emption based on the QoS of its reserved resource.

In an example situation, a WTRU may determine to monitor a pre-emption indication based on its reserved resources and the configuration of the resource pool. In an example approach, the WTRU may determine to monitor the pre-emption indication if it has the reserved resources allowed to be pre-empted. Specifically, the WTRU may determine to monitor the pre-emption if one or more of the following apply: the reserved resources belong to the resource reservation type allowed to be pre-empted; the reserved resources belong to the configured or preconfigured resource sets allowed to be pre-empted; the reserved resources for TB with the priorities allowed for pre-emption; and/or, the reserved resources belong to the cast type allowed for pre-emption. In an example, one resource pool may allow to pre-empt unicast or groupcast. In an example regarding the reserved resources belong to the resource reservation type allowed to be pre-empted, in an example, the resource pool may allow to pre-empt the semi-persistent reserved resources. Regarding the reserved resources belong to the configured or preconfigured resource sets allowed to be pre-empted, in an example, the resource sets may be subchannels and slots allowed to be pre-empted. Regarding the reserved resources for TB with the priorities allowed for pre-emption, the resources may be a sub-set of low priorities.

A WTRU may determine the number of pre-emption messages for transmission. The Tx WTRU may determine the number of pre-emption messages for one TB based on one or any combination of the following: the QoS of the pre-empted resource; the QoS of the pending TB; and/or, the CBR of the resource pool.

In an example approach, the WTRU may be configured to send a fixed number of pre-emption messages for one TB. Additionally or alternatively, the WTRU may determine the number of pre-emption messages for one TB based on the CBR of the resource pool. This approach may be motivated to guarantee the reliability of the pre-emption messages.

In an example situation, the Tx WTRU may determine to trigger pre-emption its TB based on one or any combination of the following: the number of selectable resources in the resource selection procedure; the CBR of the resource pool; the QoS of the TB; and/or, the back-off duration time.

In an example approach, the WTRU may determine to perform pre-emption if the QoS of the TB exceeds a threshold. For example, the priority of the TB is smaller than a threshold. Specifically, for examples, the WTRU may perform pre-emption if the latency requirement of the TB is smaller than a threshold, or the priority of the TB is greater than a threshold.

In another example approach, the WTRU may perform resource selection for the pending TB. However, the WTRU may perform pre-emption if the set of selectable resources is smaller than a threshold or the set of reserved resources or unavailable resource is greater than a threshold. The threshold may be fixed or may be determined based on the QoS of the TB, in an example.

In another example approach, the WTRU may perform Contention Resolution, which may require the WTRU to perform CCA and/or a backoff procedure to determine the resource for transmission of the TB. The WTRU may determine to perform pre-emption if the number of CCAs is greater than a threshold or the backoff time is higher than a threshold, in an example. The threshold may be configured or preconfigured or may be determined based on the QoS of the pending TB.

In an example situation, there may be specific Rx WTRU behavior when the Rx WTRU detects a pre-emption indication. In an example approach, when the Rx WTRU successfully decodes the pre-emption indication which pre-empts the resource overlapping with its reserved resource, then the Rx WTRU may determine whether it needs to perform collision avoidance, which may be executed by the WTRU to minimize resource collision among multiple transmissions, based on one or any combination the following: the RSRP/RSSI of the pre-emption indication; the QoS of pre-empting the TB; the QoS of the pre-empted TB; and/or, the QoS associated with the pre-empted one or more resources.

In an example approach, the WTRU may perform collision avoidance if it successfully decodes a pre-emption indication. In another example approach, the WTRU may perform collision avoidance if it successfully decodes a pre-emption indication and the RSRP/RSSI measured from the emption indication message is greater than a threshold. The threshold may be fixed, configured or preconfigured based on the QoS of the pre-emption TB or the relative QoS of the pre-empting and pre-empted TBs.

A receiving WTRU may perform collision avoidance by doing one or any combination of the following: perform resource reselection; re-encode the TB; and/or, drop the pending TB. In an example approach, the WTRU may perform collision avoidance by performing resource reselection. For example, the WTRU may perform collision avoidance by performing resource reselection for the sidelink process. Also, the WTRU may perform collision avoidance by performing resource reselection in other types of processes. The WTRU may perform resource reselection if the pre-empting WTRU pre-empts the resources to use it semi-persistently, in an example. The WTRU may perform dynamic resource selection for the TB that is supposed to be transmitted in the pre-empted resource. Additionally or alternatively, the WTRU may perform resource reselection if the QoS of the reserved resource is larger than a threshold, in an example.

In another example approach, the receiving WTRU may determine to re-encode the TB and/or puncturing/rate matching the pre-empted resource if the percentage of the pre-empted resource or the amount of the pre-empted resource is smaller than a threshold. The threshold may be determined to ensure that the transmission of the TB in the remaining resource still satisfies the QoS requirement of the TB.

In example situations, there may be other WTRUs that determine the availability of the pre-empted semi-persistence resource. A WTRU may determine the availability of one reserved semi-persistent resource being pre-empted based on the type of pre-emption. Specifically, the WTRU may determine that the reserved semi-persistent resource as still being reserved if the pre-emption is used for dynamic transmission, in an example. Additionally or alternatively, the WTRU may determine that the reserved semi-persistent resource is being released and may be replaced by another semi-persistent resource if the pre-emption is used for semi-persistent resource allocation.

Figure 3A:
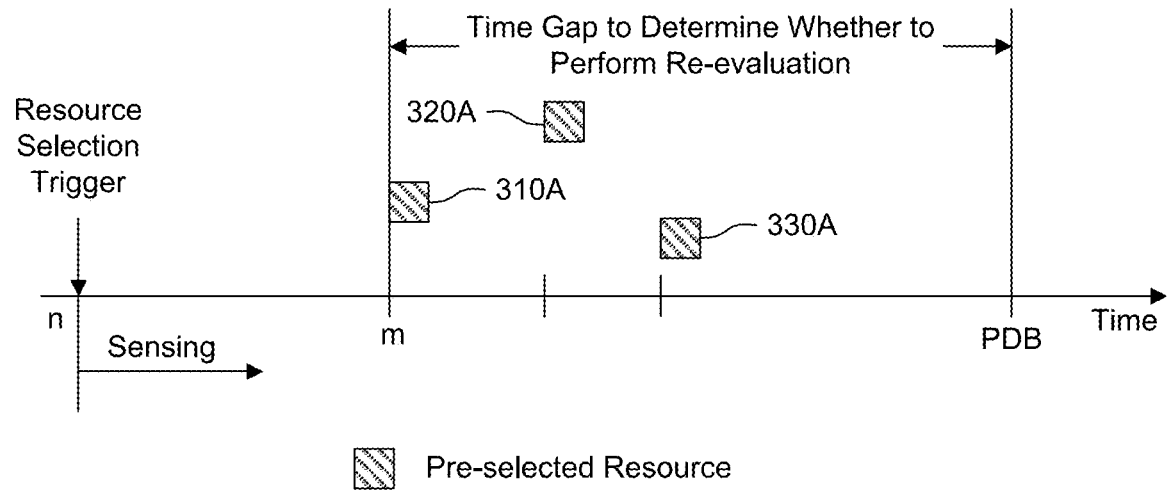
FIG. 3A is a diagram illustrating an example of resource selection and sensing.

FIG. 3A is a diagram illustrating an example of resource selection and sensing. In an example shown in FIG. 3A, a WTRU may use resources in time, shown in the x-axis, and frequency, shown in the y-axis. The WTRU may reach a resource selection trigger at time n and select resources for future transmission, such as resources 310A, 320A and 330A. Further, the WTRU may select resources, such as resources 310A, 320A and 330A, to be located in time at and after time m and within a packet delay budget (PDB). In an example, the selected resources may be considered pre-selected resources. The WTRU may further perform sensing. For example, the WTRU may perform sensing to decode SCI of one or more other WTRUs. Further, as a result of the sensing, the WTRU may determine the priority and the RSRP/RSRQ/RSSI of reserved resources, such as resources 310A, 320A and 330A, in an example. The sensing may be performed according to example procedures described elsewhere herein. Further, the WTRU may perform resource re-evaluation based on a time gap between a selected resource and a remaining PDB. The time gap may be determined according to examples provided elsewhere herein.

In an example, the WTRU may be a receiver WTRU. In a further example, the WTRU may be a V2X WTRU. In another example, the WTRU may be an SL WTRU.

Figure 3B:
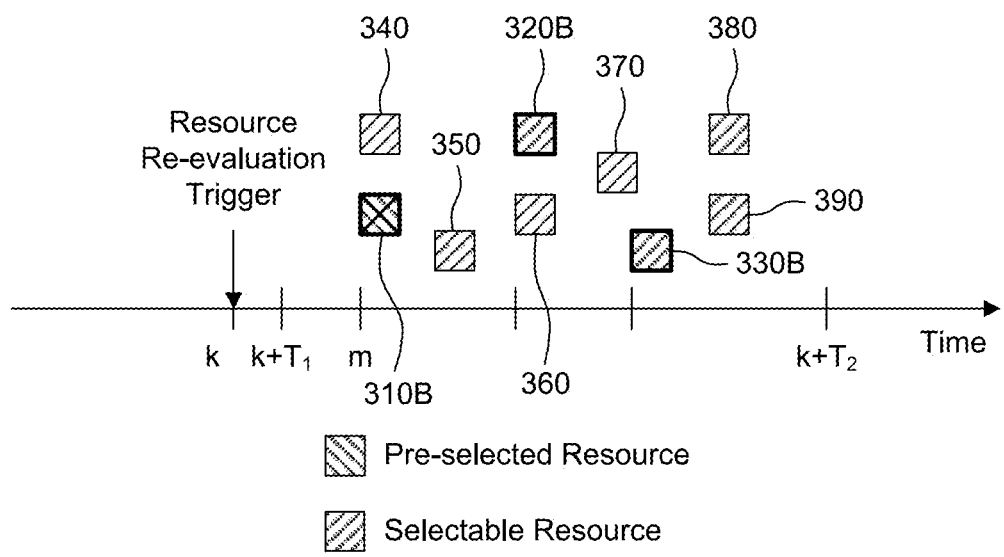
FIG. 3B is a diagram illustrating an example of resource re-evaluation including a resource reevaluation trigger.

FIG. 3B is a diagram illustrating an example of resource reevaluation including a resource reevaluation trigger. In an example shown in FIG. 3B, the WTRU may determine to perform resource reevaluation. Further, the procedures in FIG. 3B may occur after those in FIG. 3A. In an example, the WTRU may determine that a trigger may be met to perform resource reevaluation. Further, the WTRU may make the determination based on example procedures described elsewhere herein, such as one or any combination of sensing, QoS, a latency requirement or a PDB. Moreover, the WTRU make the determination at time k, as shown in FIG. 3B.

The WTRU may determine to reevaluate resources and determine to make no change in resources, in an example. In another example, the WTRU may determine to reevaluate resources and determine to make a change in resources. For example, the WTRU may determine that one or more pre-selected resources must be removed from the resources to use. Accordingly, one or more resources must be reselected from selectable resources to replace the one or more removed pre-selected resources. For example, the WTRU may determine that one or more pre-selected resources must be removed due to collision. For example, the WTRU may determine that one or more pre-selected resources will be used by another WTRU, potentially causing collision, as describe in examples provided elsewhere herein. By performing resource reevaluation, the WTRU may accordingly perform collision avoidance. Further, the WTRU may complete the reevaluation at time $k+T_1$.

In an example shown in FIG. 3B, the WTRU may perform reevaluation and determine that resource 310B must be replaced due to collision. Also, the WTRU may replace resource 310B with one or more of resources 320B, 330B, 340, 350, 360, 370, 380, 390. These resources may be located in time between time m and time $k+T_2$. Further, these resources may be used for one or more TBs. In an example, the TBs may be include one or more HARQ enable TBs, and in another the TBs may be include one or more HARQ disabled TBs. As described further below.

Figure 4:
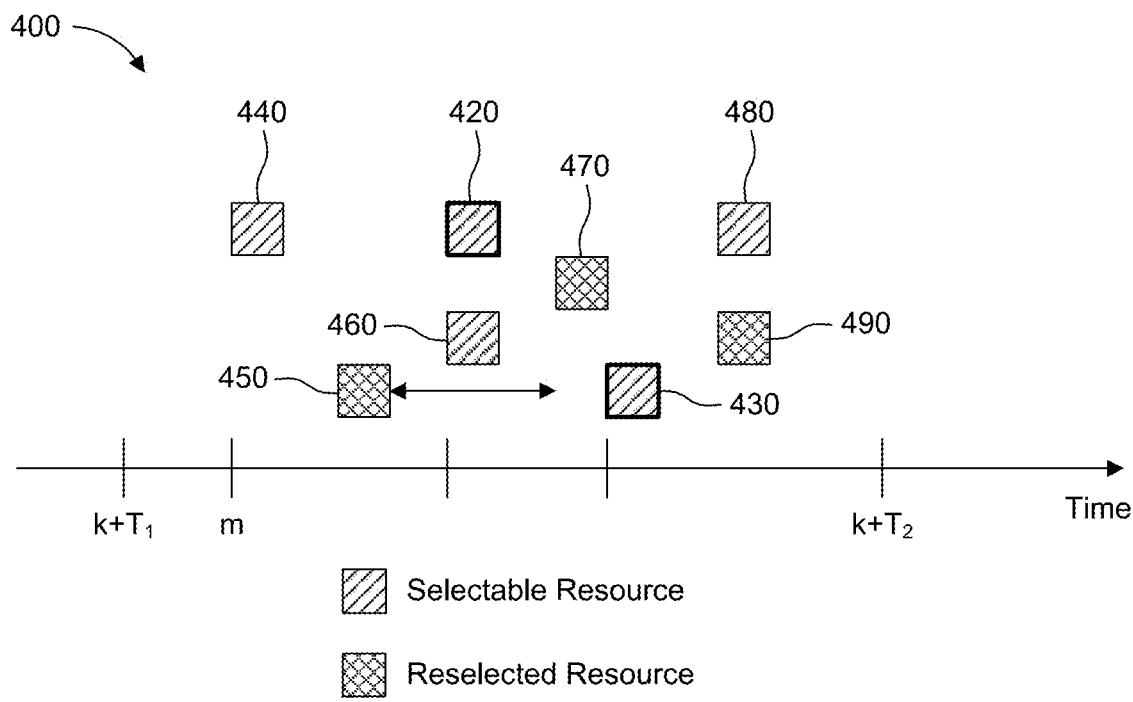
FIG. 4 is a diagram illustrating an example of resource reevaluation including a hybrid automatic repeat request (HARQ) enable transport block (TB)

FIG. 4 is a diagram illustrating an example of resource reevaluation including a HARQ enable TB. In an example shown in diagram 400, the WTRU performs resource reevaluation and reselects resources that enable HARQ processes for a TB or for one or more TBs. The WTRU must determine resources to reselect which are spaced far enough in time that HARQ processes may function properly, in an example shown in FIG. 4. For example, a the WTRU may reselect resource 450 to replace resource 310B, which must be replaced due to collision, as noted above. However, the WTRU may not then also reselect resource 420 because it is too near in time to resource 450 to allow HARQ processes to function properly. Instead, the WTRU may reselect resource 470, which is far enough in time from resource 450 to allow HARQ processes to function properly. Further, the WTRU may not then also reselect resource 430 because it is too near in time to resource 470 to allow HARQ processes to function properly. Accordingly, the WTRU may reselect resource 490, which is far enough in time from resource 470 to allow HARQ processes to function properly.

In this way, the WTRU may reselect a first resource 310B and replace the first resource with a second resource 450. Further, the WTRU may reselect a third resource 470 based on an association with the second reselected resource 450. Also, resource 490 may be reselected. As a result, since the second resource is associated with a HARQ enabled process, resources 470, 490 may also be reselected. Accordingly, resource are reselected based on an association.

Resources 440, 460, 480 are generally selectable resources, which are also potentially available for reselection, in an example. For example, the WTRU may reselect resource 440 instead of resource 450.

Figure 5:
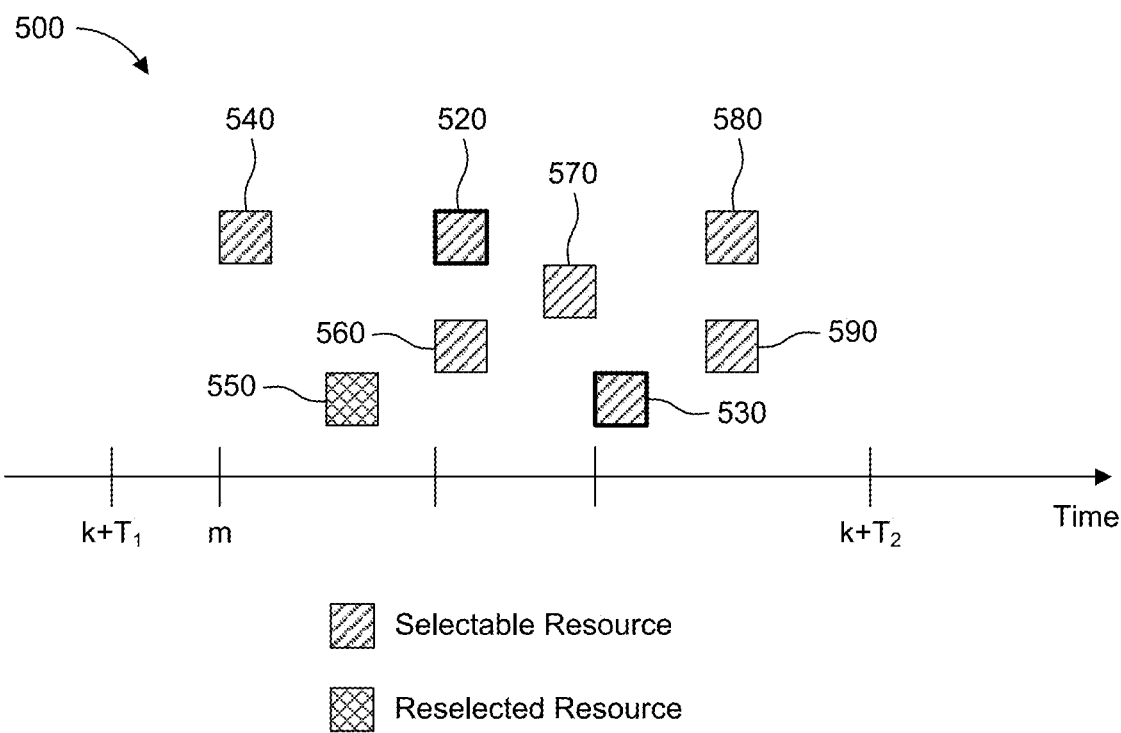
FIG. 5 is a diagram illustrating an example of resource reevaluation including a HARQ disabled TB.

FIG. 5 is a diagram illustrating an example of resource reevaluation including a HARQ disabled TB. In an example shown in diagram 500, the WTRU performs resource reevaluation and reselects resources for a TB or for one or more TBs that disable HARQ processes. Accordingly, the WTRU may determine resources to reselect without regard to spacing time for HARQ process functioning. For example, a WTRU may reselect resource 550 to replace resource 310B, which must be replaced due to collision, as noted above. In an example, the WTRU may continue to use resource 520 despite its proximity in time to resource 550. For example, resource 520 may be reselected and the WTRU may determine to again use resource 520. Likewise, the WTRU may continue to use resource 530 despite its proximity in time to resource 520.

In this way, the WTRU may reselect a first resource 310B and replace the first resource with a second resource 550. Further, the WTRU reselect a third resource 520 based on an association with the second reselected resource 550, and in this reselection keep resource 520 as a resource to use. Also, the WTRU may reselect resource 530, and in this reselection keep resource 530 as a resource to use. Accordingly, resource are reselected based on an association.

Resources 540, 560, 570, 580, 590 are selectable resources, which are also potentially available for reselection, in an example. For example, the WTRU may reselect resource 440 instead of resource 550.

In an example, a WTRU may perform resource selection and determine a set of resources to be used for transmission. For example, the resources may be used for transmission of one or more TBs. Further, the set of resources to be used for transmission may be referred to as a set of previously selected resources.

Further, the WTRU may dynamically determine to trigger resource reevaluation. The WTRU may make this determination based on a feasibility to meet latency requirements. For example, one or more resources may be found to be able to meet latency requirements. In another example, one or more resources may be found to be unable to meet latency requirements. Accordingly, these one or more resources may need to be replaced with one or more other resources. The resource reevaluation may include a determination of one or more potential collisions of one or more resources in the set of previously selected resources.

Moreover, the latency requirement may include a remaining PDB of a TB. Also, the latency requirement may include a time gap between a previously selected resource and a remaining PDB of a second TB.

In an example, the WTRU may determine a set of selectable resources by performing resource reevaluation based on the set of previously selected resources and removing one or more resources from the set of previously selected resources. Further, the WTRU may reselect at least one first resource from the set of previously selected resources. In an example, the at least one first resource may not be in the set of selectable resource. Moreover, the WTRU may reselect the at least one first resource and replace the first resource with at least one second resource from the set of selectable resources. Further, the WTRU may reselect at least one third resource from the set of selectable resources based on an association with the at least one second resource. The WTRU may then transmit a first TB using the at least one second resource.

In a further example, the WTRU may determine a set of selectable resources by performing resource reevaluation based on the set of previously selected resources. Further, the WTRU may select at least one first resource from the set of previously selected resources. In an example, the at least one first resource may not be in the set of selectable resource. Moreover, the WTRU may replace the first resource with at least one second resource. In an example, the at least one second resource may be in the set of selectable resource. Further, the WTRU may select at least one third resource from the set of selectable resources based on an association with the at least one second resource. The WTRU may then transmit a first TB using the at least one second resource.

In an additional example, the WTRU may reselect at least one fourth resource based on an association with the at least one second resource. In yet a further example, the WTRU may reselect at least one fifth resource based on an association with the at least one second resource. Additional resource may be reselected based on an association with the at least one second resource, in additional examples.

In an example, the one or more resources may be removed based on a collision. For example, the collision may be a predicted, probable collision with transmission of another WTRU. The another WTRU may be a V2X WTRU, in an example.

In an example, the association with the at least one second resource may be based on a HARQ status of the first TB. The HARQ status may be an enabled HARQ status of the TB, in an example. Accordingly, the TB may be a HARQ enabled TB.

In a further example, the HARQ status may be a disabled HARQ status of the TB, in an example. Accordingly, the TB may be a HARQ disabled TB. Moreover, additional resources may include future HARQ transmissions associated with the first TB. For example, the at least one third resource may be used for HARQ transmissions associated with the first TB.

In a further example, the association with the at least one second resource may be based on a grant. In an example, the grant may be a periodic reservation grant. Accordingly, the association with the at least one second resource may be based on a periodic reservation grant associated with the first TB. Further, additional resources may include resources associated with the periodic reservation grant. For example, the at least one third resource may be associated with the periodic reservation grant.

Moreover, a pre-empted resource may also be a periodically reserved resource. In an example, the periodically reserved resource may be used by the WTRU to transmit a periodically reserved transmission. Accordingly, the pre-empted resource may be used by the WTRU to transmit a periodically reserved transmission, in an example. In another example, the WTRU may intend to use the pre-empted resource to transmit a periodically reserved transmission. Further, the WTRU may not use the pre-empted resource for one or more future periodically reserved transmissions, in an example, after a selection or a reselection. For example, after a selection or a reselection, the WTRU may not use the at least one first resource for a current periodically reserved transmission and/or one or more future periodically reserved transmissions. Accordingly, the WTRU may assume that the pre-empted resource may be unavailable in future time periods. In an example, the pre-empted resource may be unavailable due to collision.

In an example, the pre-empted resource may be one of the one or more removed resources. For example, the pre-empted resource may be the at least one first resource. Further, the periodically reserved transmission may be associated with the periodic reservation grant.

Example situations provided herein include methods to support reservation of an initial transmission. In an example situation a WTRU may determine a resource reservation type. For example, the WTRU may support the reservation for the same TB feature where a first PSCCH+PSSCH using the first frequency resource allocation reserves the resources for the second PSCCH+PSSCH using the second frequency resource allocation to transmit the same TB. The size of the first frequency resource allocation may be smaller than, equal to, or larger than the size of the second frequency resource allocation. The WTRU may determine the difference between the size of the first frequency resource allocation and the second frequency resource allocation based on one or more of the following: the size of frequency resource allocation of the second PSCCH+PSSCH; the size of the TB; the QoS of the TB; and/or, the CBR of the resource pool.

In an example approach, the WTRU may determine a difference between the size of the first frequency resource allocation and the second frequency resource allocation based on the size of the frequency resource allocation of the first PSCCH+PSSCH. Specifically, the WTRU may determine that the sizes of the first and second frequency resource allocation are equal if the size of the frequency resource allocation of the second PSCCH+PSSCH is smaller than a threshold. Additionally or alternatively, the WTRU may determine that the size of the first frequency resource allocation is smaller than that of the second frequency allocation if the frequency size of the second PSCCH+PSSCH is larger than a threshold. For example, if the size of the frequency resource allocation of the first PSCCH+PSSCH is smaller than or equal to two subchannels, the WTRU may determine that the size of the frequency resource allocation of the first and the second PSCCH+PSSCH are equal. However, if the size of the frequency resource allocation of the second PSCCH+PSSCH is larger than two subchannels, the WTRU may determine that the size of the frequency resource allocation of the second PSCCH+PSSCH is larger than the size of the frequency resource allocation of the first PSCCH+PSSCH. In an example, the size of the frequency resource allocation of the first PSCCH+PSSCH can be 1 subchannel.

In another example approach, the WTRU may determine the difference between size of the first and second frequency resource allocation based on the size of the TB. Specifically, if the size of the TB is smaller than a threshold, the WTRU may determine that the first and the second size of the frequency resource allocation are equal, in an example. Additionally or alternatively, if the size of the TB is greater than a threshold, the WTRU may determine that the size of the frequency resource allocation of the first PSCCH+PSSCH is smaller than that of the second PSCCH+PSSCH.

In another example approach, the WTRU may determine the difference between the size of the first and second frequency resource allocation based on the QoS of the TB. For example, the WTRU may determine that the frequency size of the first and second PSCCH+PSSCH are equal if the latency of the TB is smaller than a threshold, in an example.

In an example situation, a WTRU may choose between reservation for the same TB and reservation for another TB features. The WTRU may determine to use the reservation for the same TB and/or reservation for another TB feature based on one or more of the following: the size of one TB and/or the required frequency size of one TB; the QoS of one TB; and/or the WTRU has other information available. In an example regarding the size and/or the required frequency size of one TB, the WTRU may use the reservation for another TB feature if the WTRU has two TBs at the buffer, and the size of one TB is smaller than a threshold or the required frequency size of one TB is smaller than a threshold. In an example, the frequency may be one subchannel. Regarding, the QoS of one TB, in an example, the WTRU may determine to use reservation for another TB feature if the WTRU needs to transmit one low QoS TB. Regarding the WTRU has other information available, which may require the WTRU to send, the WTRU may use the reservation for another TB feature if it has CSI information for reporting/sending, in an example.

Examples provided herein include methods to support network scheduling. For example, in NR V2X there may be modified methods to support network scheduling. For example, there may be methods to support an MCS table indication. In one situation, a WTRU may indicate its MCS table used for PSSCH transmission to the receiver WTRU. The WTRU may implicitly or explicitly indicate the used MCS table to the receiving WTRUs. The WTRU may explicitly indicate the MCS table by using one or multiple bitfields in the SCI. Additionally or alternatively, the WTRU may be configured or preconfigured with a mapping between a set of QoS parameters and an MCS table. The WTRU may then implicitly indicate the used MCS table by conveying the QoS parameters to the receiving WTRUs.

In example situations, there may be methods to support feedback based HARQ retransmission. In an example situation, a WTRU may determine which TB to transmit in a grant scheduled by the gNB. The WTRU may have the TBs at a MAC buffer and one or multiple TBs at a HARQ buffer. In an example approach, the WTRU may determine which TB to transmit in a grant scheduled by the gNB based on one or any combination of the following: the QoS of each TB, the size of the schedule grant, the buffer of the TB, whether UL HARQ of the TB has been transmitted, and/or the cast type of the TB.

In an example regarding the QoS of each TB, the WTRU may prioritize the TB with the highest priority. Regarding the size of the scheduled grant, in an example, when the WTRU needs to determine which TB in the HARQ buffer to transmit, the WTRU may prioritize the TB which requires the minimum change in the MCS compared to the previous transmission. Additionally or alternatively, the WTRU may prioritize the TB that has MCS smaller than or equal to the MCS of the previous transmission.

Regarding the buffer of the TB, the WTRU may prioritize the TB in the HARQ buffer, in an example. In an example regarding whether UL HARQ of the TB has been transmitted or not, when the WTRU needs to determine which TB in the HARQ buffer to transmit, the WTRU may prioritize the TB, in which the NACK status is conveyed to the gNB. Regarding the cast type of the TB, in an example, when two TBs have the same priority, the WTRU may prioritize the broadcast transmission.

In examples, a WTRU may determine the transmission type of the retransmission for unicast/groupcast. The WTRU may support the following retransmission types: blind retransmission, and/or feedback-based retransmission.

For blind retransmission, the WTRU may perform blind retransmission by using the same or different redundancy version (RV) with the initial transmission. Moreover, the WTRU may indicate to the receiver WTRUs that HARQ feedback should be disabled or the WTRU may not monitor the HARQ feedback of the initial transmission. For feedback-based retransmission, the WTRU may determine to perform retransmission or not based on HARQ feedback from the receiving WTRU. Moreover, the WTRU may listen to the HARQ feedback from the receiver WTRU and it may indicate to the receiver WTRU to enable HARQ feedback.

The WTRU may determine the retransmission type of a TB based on the timing of the scheduled resource for the initial transmission, retransmission, and the timing of UL HARQ feedback and SL HARQ feedback. In an example approach, the WTRU may determine to perform blind retransmission when it receives a DCI scheduling the resources for both initial transmission and retransmission, and the timing of the UL HARQ feedback for the transmission is after the retransmission. In another example approach, the WTRU may determine to perform HARQ-based retransmission if the WTRU receives a DCI, which schedules a UL HARQ feedback between the initial transmission and retransmission.

Figure 6:
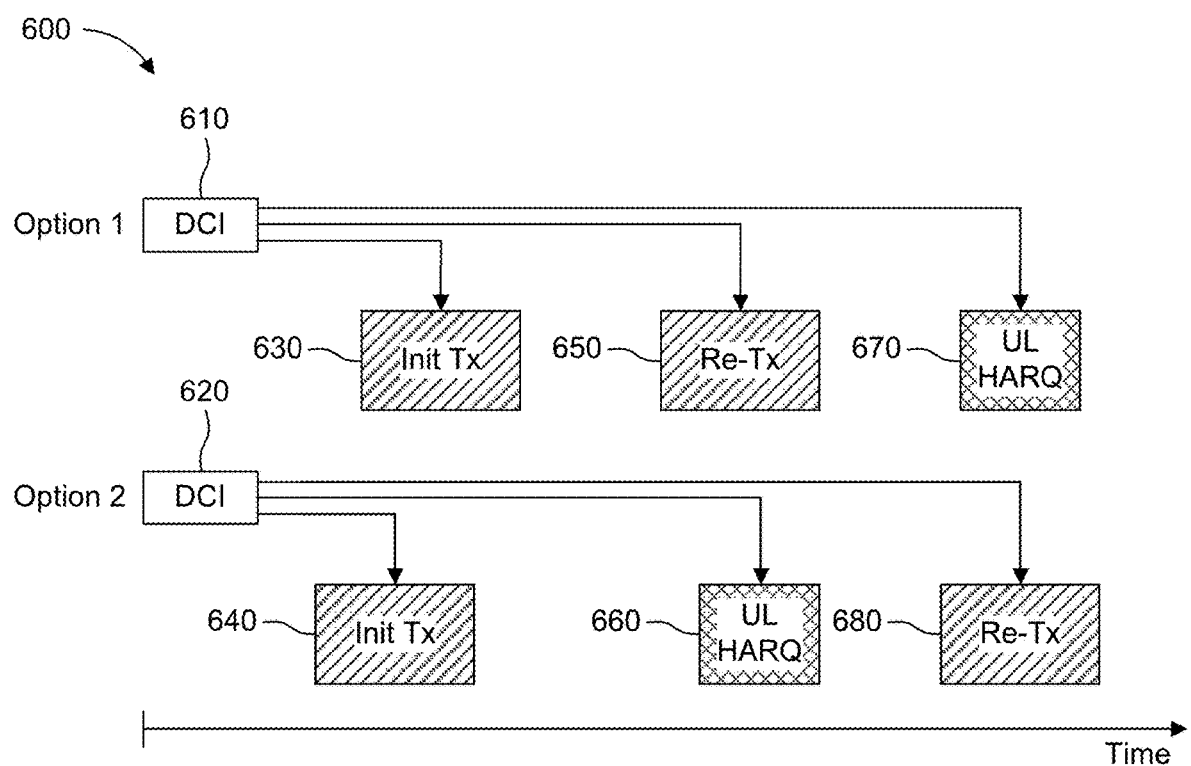
FIG. 6 is a diagram illustrating an example of a WTRU determining the type of retransmission based on timing of the initial transmission, retransmission and uplink (UL) HARQ feedback.

FIG. 6 is a diagram illustrating an example of a WTRU determining the type of retransmission based on timing of the initial transmission, retransmission and UL HARQ feedback. In the example illustrated in diagram 100 in Option 1, the WTRU may perform blind retransmission, and in Option 2 the WTRU may perform HARQ-based retransmission.

Accordingly, in Option 1, the WTRU may receive a DCI 610 scheduling the resources for both an initial transmission 630 and a retransmission 650, and the timing of the UL HARQ feedback 670 for the transmission is after the retransmission 650. As a result, the WTRU may determine to perform blind retransmission.

Further, in Option 2, the WTRU may receive a DCI 620, which schedules a UL HARQ feedback 660 between an initial transmission 640 and a retransmission 680. As a result, the WTRU may determine to perform HARQ-based retransmission.

In an example situation, the WTRU may receive a DCI which schedules a UL HARQ feedback between the initial transmission and retransmission timing resource. The WTRU may indicate to the gNB about the usage of the retransmission resource. The UL HARQ feedback may indicate one or more of the following: the WTRU uses the grant for retransmission of the same TB: the WTRU uses the grant for the transmission of another TB; and/or, the WTRU releases the grant. In another example approach, the WTRU may determine to use the retransmission resource scheduled in one DCI for the transmission of another TB if it receives an ACK from the receiver WTRU for the previous transmission.

In an example, a WTRU may determine the type of retransmission for a configured grant. In an example situation, the WTRU may be configured with one or multiple type-1 and/or type-2 configured grants. The WTRU may determine the retransmission type of the configured grant based on one or more of the following: the availability of UL HARQ feedback for the configured grant, the number of resources for transmission of one TB, and/or the time gap between two resources for transmissions of one TB. Regarding the availability of UL HARQ feedback for the configured grant, in an example for the unicast/groupcast scenario, the WTRU may determine to perform blind retransmission if the configured grant does not contain the UL HARQ feedback. Further, regarding the number of transmission resources for each TB, the WTRU may perform blind transmissions if the number of retransmission resources for each TB is greater than a threshold, in an example. In an example regarding the time gap between two resources for transmissions of one TB, the WTRU may determine to perform blind retransmission if the time gap between two consecutive resources for transmissions of a TB is smaller than a threshold. Additionally or alternatively, the WTRU may perform feedback based HARQ retransmission if the time gap between two consecutive resources is larger than a threshold. Further, the time gap threshold may be determined based on one or more of the QoS of the data, and/or the resource pool configuration, such as the periodicity of PSFCH slots and the bitmap of the resource pool, in an example.

In example situations there may methods to support in-coverage and out-of-coverage communication. In an example situation, a Tx WTRU may transmit information about its Tx pool to the Rx WTRUs. Specifically, the Tx WTRU may implicitly or explicitly transmit the information about its Tx pool to the Rx WTRUs. The information about the Tx pool may include one or more of the following information: the slots belong to the resource pool, for example, the bitmap of the resource pool; the periodicity of the PSFCH slot; the subchannel size, the number of subchannels in the resource, the first, and the last RB of the resource pool.

In an example approach, the WTRU may send the resource pool information during the link establishment procedure for the unicast scenario. In another example approach, the Tx WTRU may send some information about the resource pool implicitly or explicitly in the SCI. Specifically, the WTRU may send the information about PSFCH periodicity in SCI. Additionally or alternatively, the WTRU may be configured or preconfigured with a list of resource pools to indicate to the Rx WTRU, the WTRU may indicate the index of the resource pool to the Rx WTRUs. In another example approach, the Tx WTRU may indicate some information about the resource pool in the PSBCH. For example, the WTRU may indicate one or more of the following information in the resource pool: the PSFCH periodicity of the resource pool in PSBCH; whether HARQ is enabled/disabled; and/or, HARQ feedback option.

In examples, a WTRU may use resource pool information. In an example situation, an Rx WTRU may use the resource pool information sent by the Tx WTRU to determine the PSFCH resource to transmit the sidelink HARQ feedback, and/or perform sensing and resource selection.

In example situations, there may be methods to support feedback indication to the network. For example, an issue may arise when the WTRU may be scheduled a set of resources that have an associated PUCCH, and the gNB may expect the WTRU to transmit a HARQ enabled TB. However, in a logical channel prioritization (LCP) procedure, the WTRU may transmit a HARQ disabled TB. Accordingly, there may be a need to address how the WTRU reports HARQ ACK/NACK to the network.

The WTRU may be provided with a PUCCH resource in a dynamic or configured grant to report the HARQ status, for example, ACK/NACK, of its transmission on the associated grants. In the grant associated with the PUCCH resource, the WTRU may determine to transmit a TB with HARQ disabled. The WTRU may then determine to report either HARQ ACK or HARQ NACK based on one or any combination of parameters.

One such parameter for determining to report HARQ ACK or NACK may be QoS of the TB. For example, the WTRU may report HARQ ACK if the priority and/or reliability of the TB is larger than a threshold and it may report HARQ NACK if the priority and/or reliability of the TB is smaller than a threshold. The threshold may be configured or preconfigured by the network.

One such parameter for determining to report HARQ ACK or NACK may be the logical channels multiplexed into the grant: For example, the WTRU may be configured with a set of logical channels, which when multiplexed in the TB, will trigger indication of HARQ ACK/NACK.

One such parameter for determining to report HARQ ACK or NACK may be the amount of the assigned resources. For example, the WTRU may determine to report HARQ ACK or HARQ NACK based on the amount of resources assigned to the WTRU. Specifically, the WTRU may report HARQ ACK if the amount of the scheduled resource is greater than a threshold and report HARQ NACK if the amount of the scheduled resource is smaller than a threshold. The threshold may be fixed, (pre-)configured, and/or determined based on the QoS of the final TB transmitted in the scheduled resource.

One such parameter for determining to report HARQ ACK or NACK may be the number of the transmitted resources for the final TB before reporting HARQ feedback.

One such parameter for determining to report HARQ ACK or NACK may be the type of the assigned grant. In examples, the grant may be a configured grant or a dynamic grant). For example, the WTRU may always report HARQ ACK for the dynamic grant and it may determine to report either HARQ ACK or HARQ NACK for the configured grant.

One such parameter for determining to report HARQ ACK or NACK may be the cast types.

One such parameter for determining to report HARQ ACK or NACK may be the buffer status of the WTRU, or any indicator of the amount of data the WTRU needs to transmit. For example, if the buffer status of a logical channel group (LCG), which may be potentially related to the QoS of the transmitted TB, is above a threshold, the WTRU may report NACK.

One such parameter for determining to report HARQ ACK or NACK may be the CBR: For example, the WTRU will report ACK if the CBR is above a threshold, and NACK otherwise.

In one example instance, the WTRU may determine to report HARQ ACK or HARQ NACK based on the number of transmissions the WTRU has made for the last TB of the WTRU, and the priority and/or reliability of the TB. Specifically, the WTRU may determine the number of expected transmissions for the TB based on its priority and/or reliability. The WTRU then may determine whether it transmits HARQ ACK or NACK based on both the number of expected transmissions for the TB and the number of transmissions it has made to the TB. If the number of expected transmissions is greater than the number of transmissions the WTRU has made, the WTRU may report HARQ NACK. Otherwise, the WTRU may report HARQ ACK.

In another example instance, the WTRU may determine to report HARQ ACK or HARQ NACK based on the timing and/or the amount of the future grants. Specifically, the WTRU may report HARQ ACK if the future timing of the future grant is smaller than the PDB of the TB. Otherwise, the WTRU may report HARQ NACK. The future grant may belong to the set of a future resource set of a configured grant or a future resource set of a dynamic grant.

In another example instance, the WTRU may determine to report HARQ ACK or HARQ NACK based on its buffer status and the available resource in the future. Specifically, the WTRU may report HARQ NACK if it still has data in its buffer, for example, the data may be stored in MAC the radio link control (RLC) buffer or HARQ buffer, and/or the future resource is not able to satisfy the QoS of the pending data in the buffer. Additionally or alternatively, the WTRU may report HARQ NACK if it doesn't have data in its buffer.

The WTRU may report HARQ ACK under example conditions. In another example instance, the WTRU may report HARQ ACK if the final TB transmitted in the resources having the associated PUCCH is the HARQ disabled one.

In another example instance, the WTRU may determine to select between HARQ enabled sidelink radio bearer (SLRB) and HARQ disabled SLRB to multiplex in a TB. The WTRU may be configured or preconfigured with a priority gap between HARQ enabled and HARQ disabled SLRB to determine which type of SLRBs to multiplex in a TB for the resource having an associated PUCCH. Specifically, if the priority of the HARQ enabled SLRB is larger or equal than the priority of the HARQ disabled SLRB plus a priority gap, the WTRU may prioritize HARQ enabled SLRB over HARQ disabled SLRB, in an example. The priority gap may be configured or preconfigured or fixed. For example, if the priority gap is fixed to be zero, the WTRU may prioritize the HARQ enabled SLRB over HARQ disabled SLRB in the resource having associated PUCCH if both SLRB have the same priority.

In examples, the WTRU may determine to trigger a scheduling request (SR) and/or a buffer status report (BSR). In another example approach, the WTRU may be configured with an SR associated with the transmission of HARQ disabled TB in the resources having an associated PUCCH. The WTRU may trigger an SR and/or a BSR if the WTRU transmits a HARQ disabled TB in the final resource associated with a PUCCH. The WTRU may further trigger an SR and/or a BSR only when the WTRU reports a certain value of ACK or NACK, for example, a BSR triggered when the WTRU reports NACK, based on any of the conditions discussed herein. The WTRU may further compute a BSR after the WTRU has used the retransmission resource provided by the network following the reporting of a NACK. The WTRU may be further configured or preconfigured with one or any combination of criteria(s)/condition(s) to trigger an SR and/or a BSR.

One criteria/condition may be the QoS of the TB. For example, the WTRU may trigger an SR and/or a BSR if the priority of the TB is larger than a threshold.

One criteria/condition may be the number of transmissions the WTRU has made for the TB. For example, the WTRU may trigger an SR and/or a BSR if the number of transmissions the WTRU has made for the final TB is smaller than a threshold. The threshold may be determined based on QoS of the TB. Additionally or alternatively, the WTRU may trigger an SR and/or a BSR if it needs more resources to transmit the final TB.

One criteria/condition may be the buffer status of the WTRU. For example, the WTRU may trigger an SR and/or a BSR if it has data in its buffer.

One criteria/condition may be the amount of the assigned resources. For example, the WTRU may trigger an SR and/or a BSR if the amount of the assigned resources is smaller than a threshold. The threshold may be determined based on the QoS of the TB, configured or preconfigured.

One criteria/condition may be the type of the assigned resource. For example, the WTRU may trigger an SR and/or a BSR if the TB with HARQ disabled is transmitted in the configured grant and the WTRU may not trigger an SR and/or a BSR if the TB with HARQ disabled is transmitted in the dynamic grant.

One criteria/condition may be the cast types. For example, the WTRU may trigger an SR and/or a BSR based on cast type.

In one instance, a WTRU may cancel a pending BSR/SR transmission in the case it reports NACK to a HARQ-less transmission. Specifically, a WTRU may have a pending BSR transmission due to the arrival of new data, possibly for a higher priority logical channel (LCH). The WTRU may determine to cancel such a BSR if it determines that it can perform a sidelink transmission for the new data in the retransmission resources provided by the network. Specifically, the WTRU may determine to cancel the BSR if: the amount of resources associated with the initial TB is large enough to transmit the new data in the buffers; and/or, the expected retransmission resource timing will meet the latency requirements of the new data which triggered the BSR.

In one or more embodiments disclosed herein, the WTRU may determine whether it needs to trigger resource re-evaluation for a set of the selected one or more resources based on the time between the slot it selects the resource and the slot of the first selected resource, and/or the remaining delay budget of the TB. The WTRU may determine when to trigger resource re-evaluation. The WTRU may determine the value of T3. The WTRU may change one or more resources from the previous iteration to one or more resources from current iteration. The WTRU may reselect the one or more collided resources only. The WTRU may perform resource selection based on the availability of CSI. The WTRU may determine when to stop RSRP increment in the resource evaluation or reevaluation procedure. The WTRU may determine to report HARQ ACK or HARQ NACK. The WTRU may determine to report HARQ ACK/NACK based on the number of transmissions the WTRU has made for a TB and its QoS. The WTRU may determine to report HARQ ACK/NACK based on the timing and/or the amount of the future grant. The WTRU may determine to report HARQ ACK or HARQ NACK based on its buffer status and the available resource in the future. The WTRU may report HARQ ACK. The WTRU may select between HARQ enabled SLRB and HARQ disabled SLRB to multiplex in a TB. The WTRU may determine to trigger SR and/or BSR.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a transceiver; and
a processor operatively coupled to the transceiver; wherein:
the transceiver and the processor are configured to receive first data on a first physical sidelink shared channel (PSSCH) transmission;
the transceiver and the processor are configured to transmit second data on a second PSSCH transmission;
the transceiver and the processor are configured to receive third data on a third PSSCH transmission;
the processor is configured to determine, based on a first priority associated with the first data, a second priority associated with the second data, and a third priority associated with the third data, prioritization between transmission of physical sidelink feedback channel (PSFCH) and reception of PSFCH;
the transceiver and the processor are configured to determine, on a condition that the transmission of PSFCH is determined in the prioritization determination, based on a power level of a first PSFCH transmission associated with the first data and a power level of a second PSFCH transmission associated with the third data, to transmit a single PSFCH transmission or multiple PSFCH transmissions;
the transceiver and the processor are configured to determine, on a condition that transmission of the single PSFCH transmission is determined, based on the first priority associated with the first data and the third priority associated with the third data, whether the single PSFCH transmission is the first PSFCH transmission or the second PSFCH transmission; and the transceiver and the processor are configured to transmit the single PSFCH transmission, wherein on a condition that the single PSFCH transmission is determined to be the first PSFCH transmission, first hybrid automatic repeat request (HARQ) acknowledgement (ACK)/negative ACK (NACK) feedback associated with the first data is transmitted on the first PSFCH transmission, and wherein on a condition that the single PSFCH transmission is determined to be the second PSFCH transmission, second HARQ ACK/NACK feedback associated with the third data is transmitted on the second PSFCH transmission.

2. The WTRU of claim 1, wherein the transceiver and the processor are further configured to receive first sidelink control information (SCI) associated with the first PSSCH transmission.

3. The WTRU of claim 1, wherein the transceiver and the processor are further configured to transmit second SCI associated with the second PSSCH transmission.

4. The WTRU of claim 2, wherein the first priority is based on a first priority value.

5. The WTRU of claim 4, wherein the first priority value is received in the first SCI.

6. The WTRU of claim 4, wherein the second priority is based on a second priority value.

7. The WTRU of claim 6, wherein the second priority value is received in third SCI.

8. The WTRU of claim 1, wherein the first priority is based on a first quality of service (QOS).

9. The WTRU of claim 1, wherein the second priority is based on a second QoS.

10. The WTRU of claim 1, wherein one of the first HARQ ACK/NACK feedback or the second HARQ ACK/NACK feedback is dropped based on the first priority and the third priority.

11. The WTRU of claim 1, wherein the transceiver and the processor are configured to receive, on a condition that the reception of PSFCH is determined in the prioritization determination, a third PSFCH transmission associated with the second data, wherein third HARQ ACK/NACK feedback associated with the second data is received on the third PSFCH transmission.

12. The WTRU of claim 1, wherein the transceiver and the processor are configured to transmit, on a condition that the transmission of multiple PSFCH transmissions is determined, the first PSFCH transmission and the second PSFCH transmission, wherein the first HARQ ACK/NACK feedback associated with the first data is transmitted on the first PSFCH transmission and the second HARQ ACK/NACK feedback associated with the third data is transmitted on the second PSFCH transmission.

* * * * *